(12) United States Patent
Hartbauer

(10) Patent No.: US 10,929,967 B2
(45) Date of Patent: Feb. 23, 2021

(54) METHOD AND DEVICE FOR IMAGE PROCESSING

(71) Applicant: KARL-FRANZENS-UNIVERSITAT GRAZ, Graz (AT)

(72) Inventor: Manfred Hartbauer, Ligist (AT)

(73) Assignee: KARL-FRANZENS-UNIVERSITÄT GRAZ, Graz (AT)

(*) Notice: Subject to any disclaimer, the term of this patent is extended or adjusted under 35 U.S.C. 154(b) by 102 days.

(21) Appl. No.: 16/474,761

(22) PCT Filed: Dec. 15, 2017

(86) PCT No.: PCT/EP2017/083061
§ 371 (c)(1),
(2) Date: Jun. 28, 2019

(87) PCT Pub. No.: WO2018/122008
PCT Pub. Date: Jul. 5, 2018

(65) Prior Publication Data
US 2019/0340738 A1    Nov. 7, 2019

(30) Foreign Application Priority Data
Dec. 28, 2016    (EP) .................................... 16207102

(51) Int. Cl.
*G06T 5/50*    (2006.01)
*G06T 5/00*    (2006.01)

(52) U.S. Cl.
CPC ............... *G06T 5/50* (2013.01); *G06T 5/002* (2013.01); *G06T 5/009* (2013.01);
(Continued)

(58) Field of Classification Search
None
See application file for complete search history.

(56) References Cited

U.S. PATENT DOCUMENTS

| 5,424,783 A | 6/1995 | Wong |
| 6,718,068 B1 | 4/2004 | Gindele et al. |

(Continued)

FOREIGN PATENT DOCUMENTS

| CN | 102203826 A * | 9/2011 | ............... G06T 5/50 |
| WO | 2013/038333 A2 | 3/2006 | |
| WO | 2006/082590 A2 | 8/2006 | |

OTHER PUBLICATIONS

Buades, Antoni, Bartomeu Coll, and J-M. Morel. "A non-local algorithm for image denoising." 2005 IEEE Computer Society Conference on Computer Vision and Pattern Recognition (CVPR'05). vol. 2. IEEE, 2005. (Year: 2005).*

(Continued)

*Primary Examiner* — Michelle M Entezari
(74) *Attorney, Agent, or Firm* — Eversheds Sutherland (US) LLP

(57) ABSTRACT

Method for processing of a grey scale image, in particular a dim grey scale image, comprising the following steps: a) receiving an initial grey scale image, said initial grey scale image having a plurality of pixels at an initial resolution, b) calculating parameters characterizing the luminance (gain, median_grey, var_grey) and the noise level (X, noise_estimate, radius_spatial_summation, grid_size, threshold_var) of the initial grey scale image of step a), c) creating a basic intermediate image, d) creating an averaged intermediate image, and e) creating an enhanced grey scale image by interpolation of pixels based on the averaged receptors (greyAvg) of the averaged intermediate image of step d).

17 Claims, 17 Drawing Sheets

(52) U.S. Cl.
CPC .............. *G06T 2207/10048* (2013.01); *G06T 2207/10064* (2013.01); *G06T 2207/20192* (2013.01); *G06T 2207/20216* (2013.01); *G06T 2207/30004* (2013.01); *G06T 2207/30232* (2013.01)

(56) References Cited

U.S. PATENT DOCUMENTS

| | | | | |
|---|---|---|---|---|
| 8,139,889 | B2* | 3/2012 | Malm | ............... G06T 5/002 382/261 |
| 8,605,970 | B2* | 12/2013 | Bar-Aviv | ............... G06T 5/50 382/128 |
| 10,262,397 | B2* | 4/2019 | Kounavis | ............... G06T 7/13 |
| 2005/0175235 | A1* | 8/2005 | Luo | ............... G06K 9/6256 382/159 |
| 2007/0065009 | A1 | 3/2007 | Ni et al. | |
| 2010/0080439 | A1* | 4/2010 | Karam | ............... G06K 9/00134 382/133 |
| 2010/0272356 | A1* | 10/2010 | Hong | ............... H04N 5/23229 382/170 |
| 2017/0243351 | A1* | 8/2017 | Li | ............... G06T 3/0068 |

OTHER PUBLICATIONS

Laghrib, Amine, Abdelilah Hakim, and Said Raghay. "A combined total variation and bilateral filter approach for image robust super resolution." EURASIP Journal on Image and Video Processing 2015.1 (2015): 1-10. (Year: 2015).*
Chan, Tony F., Stanley Osher, and Jianhong Shen. "The digital TV filter and nonlinear denoising." IEEE Transactions on Image processing 10, No. 2 (2001): 231-241. (Year: 2001).*
Yuan, Qiangqiang, Liangpei Zhang, and Huanfeng Shen. "Hyperspectral image denoising employing a spectral-spatial adaptive total variation model." IEEE Transactions on Geoscience and Remote Sensing 50.10 (2012): 3660-3677. (Year: 2012).*
Aggarwal, Hemant Kumar, and Angshul Majumdar. "Hyperspectral image denoising using spatio-spectral total variation." IEEE Geoscience and Remote Sensing Letters 13.3 (2016): 442-446. (Year: 2016).*
Machine Translation of CN 102203826 A (Year: 2011).*
Bader, et al. (1996) Parallel algorithms for image enhancement and segmentation by region growing, with an experimental study. J. Supercomputing, 10, 141-168.
Buades, et al. (2005) A Review of Image Denoising Algorithms, with a New One. Multiscale Modeling & Simulation, 4, 490-530.
Chen, et al. (2005) Experimental tests of image fusion for night vision. 8th Int'l Conf. on Information Fusion, p. 8.
Crouse, et al. (1998) Wavelet-based statistical signal processing using hidden Markov models. IEEE Transactions on Signal Processing, 46(4):886-902.
Dabov, et al. "Image denoising with blockmatching and 3D filtering," Proc. SPIE Electronic Imaging '06, No. 6064A-30, San Jose, California, USA.
Fan, et al. (2001) Image denoising using a local contextual hidden Markov model in the wavelet domain. IEEE Signal Processing Letters, 8(5):125-128.
Lee, et al. (2014) A Framework for Moving Least Squares Method with Total Variation Minimizing Regularization. J Math Imaging Vis 48, 566-582.
Liu, et al. (2008) Automatic estimation and removal of noise from a single image. IEEE transactions on pattern analysis and machine intelligence, 30, 299-314.
Maggioni, et al. (2013) Nonlocal Transform-Domain Filter for Volumetric Data Denoising and Reconstruction. IEEE Transactions on Image Processing, 22, 119-133.
Nirmala, et al. (2012) Review on Image Enhancement Techniques: FPGA Implementation perspective. International Journal of Electronics Communication and Computer Technology, 2.
Polesel, et al. (2000) Image enhancement via adaptive unsharp masking. IEEE Transactions on Image Processing, 9, 505-510.
Portilla (2004) Full blind denoising through noise covariance estimation using Gaussian scale mixtures in the wavelet domain. In Proc. IEEE Int'l Conf. Image Proc., pp. 1217-1220.
Rudin, et al. (1992) Nonlinear total variation based noise removal algorithms. Physica D: Nonlinear Phenomena, 60, 259-268.
Russo (2004) Piecewise Linear Model-Based Image Enhancement. EURASIP Journal on Advances in Signal Processing, 2004, 1861-1869.
Stockl, et al. (2016) Neural Summation in the Hawkmoth Visual System Extends the Limits of Vision in Dim Light. Current Biology 26, 821-826.
Venkateshwar, et al. (2006) "Implementation and Evaluation of Image Processing Algorithms on Reconfigurable Architecture using c-based Hardware Description Language," Int'l J. Theoretical and Applied Computer Sci., GBS publishers & distributers (India) vol. 1, pp. 9-34.
Wang, et al. (2007) A Fast Algorithm for Image Deblurring with Total Variation Regularization.
Warrant, et al. (2014) The Remarkable Visual Abilities of Nocturnal Insects: Neural Principles and Bioinspired Night-Vision Algorithms. Proceedings of the IEEE, 102, 1411-1426.
Xilinx Inc., (2012) System Generator for Digital signal Processing, URL: http://www.xilinx.com/tools/dsp.htm.
Yoon, et al. Adaptive Total Variation Minimization-Based Image Enhancement from Flash and No-Flash Pairs, Adaptive Total Variation Minimization-Based Image Enhancement from Flash and Na-Flash Pairs. The Scientific World Journal 2014.
Zhang, et al. (2010) Image parallel processing based on GPU. 2010 2nd Int'l Conf. Advanced Computer Control (ICACC), pp. 367-370.
International Search Report, PCT/EP2017/083061, dated Feb. 6, 2018 (13 pages).

* cited by examiner

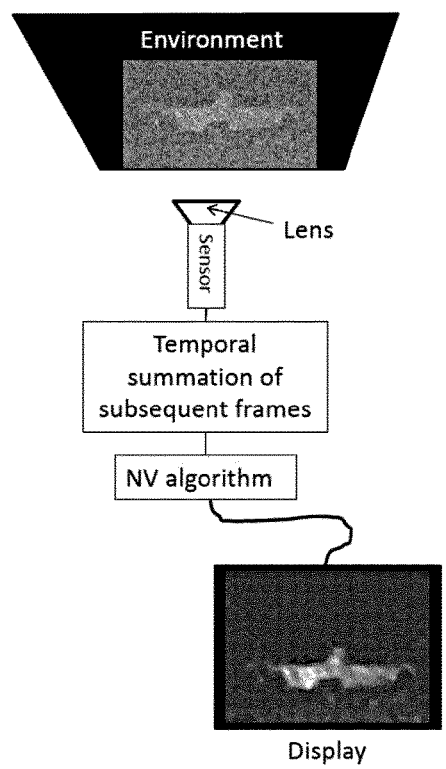
Fig. 15
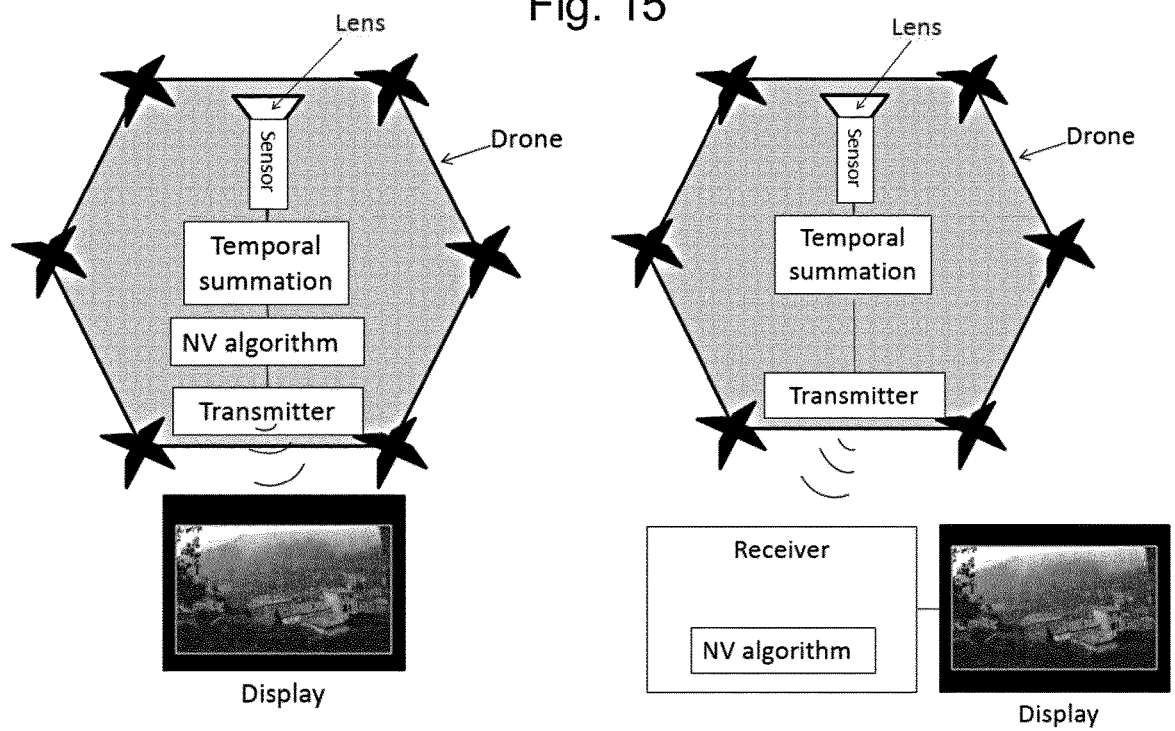
Fig. 16
Fig. 17

METHOD AND DEVICE FOR IMAGE PROCESSING

FIELD OF THE INVENTION AND DESCRIPTION OF PRIOR ART

The present invention relates to a method for processing of a grey scale image, in particular a dim grey scale image. Moreover, the present invention also relates to an image processing device.

In particular, the present invention belongs to the field of image processing technology, and especially relates to a method for image enhancement and denoising. Image processing can be used for consumer digital image acquisition devices, night vision goggles, medical imaging, fluorescent images, astronomy images, video surveillance and other fields.

Contrast enhancement of dim images leads to an amplification of noise. Image noise adversely affects the representation of image details, which reduces image quality. Denoising of images is a hot issue in the field of image processing and is usually accomplished by means of computationally demanding filtering techniques.

According to image characteristics and the statistical characteristics of noisy digital images, a variety of different de-noising algorithms have been put forward. Denoising algorithms can be divided into either spatial or frequency domain filtering, of which the latter is based on smoothing local image information. Recently, a neurophysiological study performed on hawkmoths revealed that the spatial and temporal summation of visual information combines in a supralinear fashion, enabling these insects to detect visual motion even under the dimly luminescent conditions of starlight (Stöckl et al. 2016). The method used by hawkmoths to eliminate noise, namely filtering in the spatial and temporal domains, is mirrored in some denoising algorithms that are available for amplifying and denoising films collected in dim light (e.g., Liu et al. 2008; Warrant et al. 2014).

The quality of images taken under dim light conditions is also often reduced by imperfections in the sensor itself, of 'sensor grain noise'. Generally, dim images have a very limited luminance range, which limits the content of information in the image. If any measure is undertaken to improve image contrast, such as the traditional method of histogram stretching, sensor noise is unavoidably amplified. The goal of image denoising is to preserve as many image details as possible while eliminating noise. The elimination of noise from static images is usually a challenging task for any denoising algorithm, because the temporal domain is not available. However, denoising can be achieved by the application of linear and nonlinear filters. Linear filters take the forms of smoothing or low-pass, sharpening, Laplacian, un-sharp masking, or high-boost filters. Nonlinear filters include order statistic filters such as minimum, median, and maximum filters (for a review of methods, see Buades et al. 2005 and Nirmala et al. 2012).

Simple denoising techniques that are applied such as linear smoothing or median filtering can reduce noise, but at the same time smooth away edges, so that the resulting image becomes blurry. A popular alternative denoising method is total variation (TV) denoising, which has been described by Rudin et al. (1992). This method minimizes the total variation of the luminance values that can mainly be attributed to noise. The TV regularization method preserves salient edges while effectively removing noise. Lee et al. (2014) published a framework for a Moving Least Squares Method with Total Variation Minimizing Regularization. Yoon et al. (2014) improved the preservation of fine image details by developing an adaptive, TV-minimization-based image enhancement method (ATVM). To conduct processing in the frequency domain, operations are performed on a Fourier transform of the image rather than on the image itself. The techniques that fall under this category include low pass, high pass, homomorphic, and linear and root filtering. Fourier-transformed images are filtered and inverse transformed to reduce noise and prevent the image edges from blurring. The disadvantages of frequency domain methods are that they introduce certain artifacts and cannot simultaneously enhance all parts of the image very well. In addition, it is difficult to automate the image enhancement procedure. 2007, K. Dabov, Alessandro Foi et al. proposed the method of block matching noising 3D Collaborative Filtering. This method combines image sparsity nonlocal similarity and frequency domain filtering. Frequency filtering of similarity maps has proved to be a powerful method for image denoising (BM3D, published by Maggioni et al. 2013). This method divides the image into small pieces (2D blocks) and, after 3D transformation of similar blocks, the filtering process eliminates noise while leaving the object details mostly untouched (the main parts of this algorithm are described in Patents CN103606132 (A) and GB2481239 (A)). 3D Collaborative filtering can effectively suppress image noise while preserving as much image detail as possible. In addition, wavelet-domain hidden Markov models have been applied to image denoising with fascinating results, especially when applied to diagnostic images (Crouse 1998; Fan and Xia 2001; Portilla et al. 2003). Although the wavelet-based method is popular and commonly used, this method has a disadvantage in that it tends to introduce additional edges or structures into the denoised image.

In order to reduce the computational time required by complex image-processing algorithms such as edge detectors, homomorphic filtering, and image segmentation, general-purpose computing methods using graphics processing units were developed (Bader et al. 1996; Zhang et al. 2010). More simple, computationally less demanding algorithms were developed as another strategy to reduce processing time. For example, the simple piecewise linear (PWL) function sharpens image edges and reduces noise simply by evaluating the luminance of pixels in a window of 3×3 pixels around each pixel (Russo 2004). Its effects can easily be controlled by varying only two parameters. Such simple algorithms can be implemented in reconfigurable hardware in the form of field-programmable gate arrays (FPGA), which is considered a practical way to obtain high performance when using computationally-intensive image processing algorithms (Venkateshwar Rao et al. 2006; Xilinx Inc. 2012).

The method described within the present application constitutes an efficient, bio-inspired algorithm that can be used to enhance the overall quality and contrast of dim images. It can operate in the spatial domain at the level of receptors, which sum up the luminance of surrounding pixels. It also can be used to effectively remove noise without affecting the object contours greatly. Essential parameters of the algorithm can be derived from global image statistics and a simple form of noise estimation. Due to the pixel-wise execution of this method, it can be implemented in image processing hardware such as FPGA chips, which allows the execution of commands in parallel. Its performance can come close or even succeed that of state-of-the-art denoising methods that operate in the spatial and frequency domains.

SUMMARY OF THE INVENTION

It is an object of the present invention to create a method for efficient image enhancement and denoising. Moreover, it is also an object of the present invention, to provide an image processing device performing said method.

This aim is achieved by means of a method for processing of a grey scale image, in particular a dim grey scale image, comprising the following steps:

a) receiving an initial grey scale image, said initial grey scale image having a plurality of pixels at an initial resolution, b) calculating parameters characterizing the luminance and the noise level of the initial grey scale image of step a), c) creating a basic intermediate image, said basic intermediate image having a plurality of basic receptors at a calculated resolution that is equal or lower than the resolution of the initial grey scale image, wherein each basic receptor represents a number of corresponding pixels of the image of step a) by mapping the number of pixels to a basic receptor, and wherein the number of pixels to be mapped to a basic receptor is derived from the parameters of step b), and wherein the number of basic receptors is derived in dependence of the number of pixels of the initial grey scale image and in dependence from the parameters of step b), d) creating an averaged intermediate image, said averaged intermediate image having a plurality of averaged receptors at a resolution essentially similar to the resolution of the basic intermediate image of step c), wherein the averaged receptors are calculated by applying adaptive spatial averaging on the intermediate image of step c), wherein adaptive spatial averaging comprises the steps d1) selecting a basic receptor of the intermediate image, wherein the distance r between directly neighboring basic receptors is set to an initial value, preferably r=1, d2) calculating the deviation of basic receptors that are arranged within a distance r with regard to the selected basic receptor, d3) comparing the deviation calculated in step d2) with a threshold derived from the parameters of step b), and increasing the distance r in case the calculated deviation does not exceed the threshold, d4) iteratively repeating steps d2 to d3 until the deviation calculated in the previous step d3) exceeds the threshold, and d5) averaging the selected basic receptor based on the basic receptors that are arranged within the previously set distance r, yielding an averaged receptor of the averaged intermediate image, wherein steps d1 to d5 are applied on each basic receptor of the basic intermediate image, e) creating an enhanced grey scale image by interpolation of pixels based on the averaged receptors of the averaged intermediate image of step d).

By virtue of this method it is possible to enhance and/or denoise images effectively, without the need of a transformation of the image into the frequency domain. The method according to the invention provides significant image enhancements while having low requirements in terms of processing power/computational power. Therefore, the method according to the present invention is also suited to be implemented in real time applications like night vision devices or similar applications.

Receiving an initial grey scale image in step a) can imply the action of taking an internal or external image file as an input.

Step b) comprises calculating parameters characterizing the luminance and the noise level of the initial grey scale image of step a). As will be described below, these parameters could represent the average luminance of the greyscale image (see for instance the variable "gain" of equation 1), a noise estimate (see for instance the variable "noise_estimate" of equation 3), or parameters derived from a combination of luminance level and noise level (see for instance the variables "radius_spatial_summation", "grid_size" and "threshold_var" of equations 4 to 6).

Of course, the term "grey scale image" does not delimit the spectrum of the images. Although grey scale images often refers to images having white and black color in different intensity, the term "grey scale image" here refers within the disclosure of this application to any image, having a plurality of pixels at a given resolution, wherein the luminance of the pixels can be represented by a value within a certain range, for instance a 8 bit range allowing a range from 0 to 255. Typically, these pixels are arranged in a matrix. The value "0" of a pixel can represent the color "black" (or the absence of white") whereas the value "255" could represent the color white at highest luminance. Same could be applied on other image representations, for instance on RGB-images, when the image is split into a red image, a green image and a blue image, and the value "0" would represent the absence of the color red, green or blue, and the value "255" would represent said color at highest luminance. Of course, the present invention can be applied similarly on images having different bit depths and is not delimited to 8 bit images.

The basic intermediate image of step c) does not need to exist "in real" and it is not necessary to provide this image as an output. The term "basic intermediate image" refers to the result of a calculation, that is provided as an input in the following step d). Hence, the basic intermediate image consists of a plurality of basic receptors at a calculated resolution, wherein basically every receptor represents the luminance of a number of pixels.

The processes of mapping pixels to receptors, creating an averaged intermediate image (step d)), and creating an enhanced grey scale by interpolation of pixels based on step d) is described by way of an example in the chapter "Detailed description of embodiments of the invention". Preferably, the deviation in step d2 is obtained by taking the statistical variance of receptor values. Adaptive spatial averaging according to step d) can be performed by summing up or averaging the grey values of neighboring pixels that are mapped to basic receptors in a fixed distance that is defined in step b. The mapping of the number of pixels to a basic receptor can be executed by retrieving the luminance value of each pixel within the number of pixels to set a corresponding luminance of each basic receptor, in particular by summation or averaging the luminance values of the neighboring pixels.

The term "at a resolution essentially similar to the resolution of the basic intermediate image" used in the expression " . . . said averaged intermediate image having a plurality of averaged receptors at a resolution essentially similar to the resolution of the basic intermediate image of step c)" of step d) means that the resolutions do not necessarily need to match precisely, although they can. For instance, the pixels that are arranged on the border of the image do not have neighboring outer pixels, therefore, the averaging function is adjusted in this area. There are a plurality of possibilities to deal with this issue, for instance skipping the averaging function of the outer pixels, thus reducing the resolution of the averaged intermediate image, or by copying the values of the pixels that are arranged on the border of the image to "virtual" outer neighboring pixels in order to enable performing the averaging calculation on the pixels arrange on the image borders. For instance, a basic intermediate image having a resolution of 600×400 basic receptors can result in an averaged intermediate image having a resolution of 598×398 averaged receptors in case that the outer columns and rows of basic receptors are skipped as a result of the averaging process. The initial value set in step d1) can be for instance 1. However, a person skilled in the art is able set a different value in order to optimize a specific algorithmic realization of this invention.

The term "enhanced grey scale image" used in step e) refers to an image, that had been processed according to the present invention, that typically offers a reduced noise level and an enhanced contrast. The number of pixels to be mapped to a basic receptor in step c) depends on the parameters calculated in step b). These pixels are neighboring pixels. Therefore, each receptor represents a local averaged or summed representation of these pixels.

Advantageously, in step c) the mapping the number of pixels to a basic receptor is executed by retrieving the luminance value of each pixel within the number of pixels to set a corresponding luminance of each basic receptor, in particular by summation or averaging the luminance values of the pixels, wherein said pixels are neighboring to each other.

Preferably, the contrast of the basic intermediate image can be enhanced by applying a logarithmic transformation (for instance see chapter "logarithmic transformation" of the detailed description, in particular Equation 8) on the values of each basic receptor. This yields an enhanced basic intermediate image, that can be taken as an input in the following step d). As the basic intermediate image yielded in step c) has a reduced noise level due to the spatial summation, this basic intermediate image can be amplified by logarithmic transformation to yield an enhanced basic image while maintaining a low noise level.

Advantageously, in case the calculated deviation of step d3) does not succeed the threshold the distance r in step d3 can be increased by 1 (corresponding to the dimension of a pixel respectively the distance between directly neighboring pixels). This allows efficient iterations and enhanced processing speed.

In order to delimit image blur and to optimize the calculation time, the maximum distance r in step d3) can be delimited to the value 10.

Preferably, in step c) the number of basic receptors can be less or equal to the number of pixels, and wherein the number of pixels to be mapped to each basic receptor similar for all basic receptors and derived from the parameters of step b). Advantageously the number of basic receptors is calculated as follows:

$$N_{rb} = \frac{1}{\text{grind\_size}^2} N_{pi},$$

wherein the variable grid_size is a natural number in the range of grid_size≥1, wherein the value of the variable grid_size is derived from the parameters of step b) (see chapter "spatial summation"). In the event that the number of basic receptors $N_{rb}$ equals the number of pixels (grid_size=1), the resolution of the basic intermediate image equals the resolution of the initial grey scale image, for instance 600×400. In case the distance r between each receptor is two pixels (the parameter "grid_size" would have the value "2" in this case, i.e. grid_size=2), the resolution of the basic intermediate image would be reduced to 300×200 receptors, if a grey scale image having a resolution of 600×400 pixels would be taken as an input. Consequently, the number of receptors would have been reduced by the factor $2^2=4$, which allows an effective reduction of the number of calculations to be performed in order to provide the enhanced image of step e). Therefore, the image processing can be speeded up while reducing the required computational power.

Advantageously, contrast enhancement can be applied on the averaged intermediate image of step d) by multiplying the luminance value of each averaged receptor with a factor k, preferably k>1, wherein the factor k is derived from the initial luminance values of the sum of the averaged receptors (for instance see equation 11). The contrast enhanced averaged intermediate image can be taken as an input in step e) of claim 1.

Preferably, the initial grey scale image has a plurality of pixels at an initial resolution between 100×100 and 2000×2000.

Advantageously, the grey scale image can have a bit depth between 7 and 32 bit, in particular 8 bit.

Preferably, the calculations of separate basic receptors and/or the calculations of separate averaged receptors and/or the interpolations of separate pixels of the enhanced grey scale image are executed in parallel. This allows to speed up the calculation process by processing the images pixel by pixel and/or receptor by receptor in the spatial domain.

Advantageously, in step d3) in case the calculated deviation does not exceed the threshold the distance r can be increased by n, wherein n is a natural number, and n is in the range of n≥1, wherein the value of n is derived from the parameters of step b). Preferably, n equals grid_size.

Moreover, the invention also refers to an image processing device comprising a storage medium for storing a program-logic for carrying out the method according to the invention, and a processor, in particular a field-programmable gate array for carrying out said program-logic and/or the method according to the invention. Such an image processing device can be applied for instance in night vision systems, diagnostic systems etc.

Preferably, the image processing device is realized in one of the following devices: {surveillance system, night vision device, wearable night vision device, night vision device of a vehicle or drone, medical diagnostic device, fluorescence image enhancer}. In other words: Surveillance system, night vision device, wearable night vision device, night vision device of a vehicle or drone, medical diagnostic device or fluorescence image enhancer can comprise a image processing device according to the present invention.

The method according to the present invention and/or the image processing device according the present invention can be therefor used by/in/for a surveillance system, a night vision device, in particular a wearable night vision device or a night vision device of a vehicle or drone, a medical diagnostic device, or a fluorescence image enhancer.

BRIEF DESCRIPTION OF THE DRAWINGS

In the following, in order to further demonstrate the present invention, illustrative and non-restrictive embodiments are discussed, as shown in the drawings, which show:

FIG. 2 (A) shows an original dim image received in step a) of the method. A noise estimate is shown in (B), wherein noise was calculated in homogeneous image regions and is shown in the false color-image, wherein black pixels represent no noise or low noise level and grey pixels represent noise. (C): The result of the first spatial domain averaging using a circle with a fixed radius of 1.7 (6 pixels). (D) The output image after performing adaptive spatial averaging.

FIGS. 13 to 19 show different exemplary applications of the present invention.

DETAILED DESCRIPTION OF EMBODIMENTS OF THE INVENTION

Figure 1:
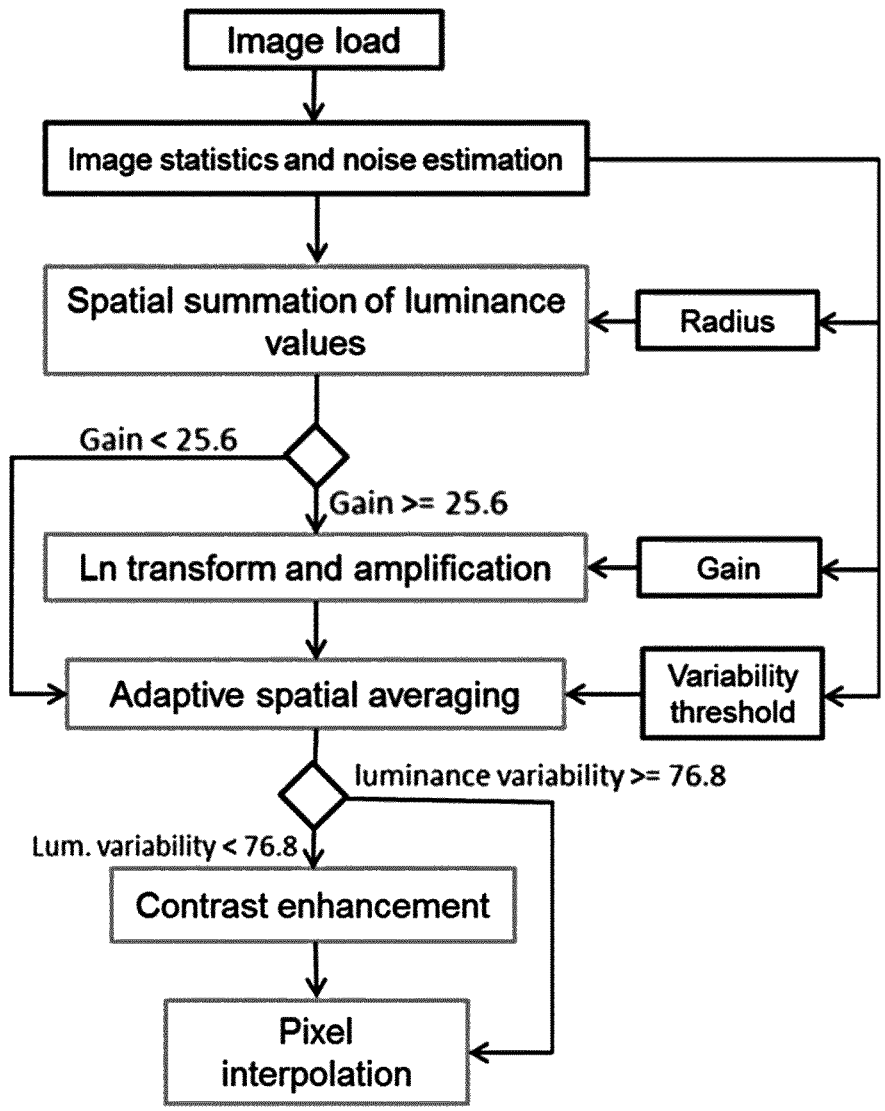
FIG. 1 Schema of image-processing steps according to the present invention.

FIG. 1 shows a schematic overview of an exemplary embodiment of the method according to the invention. Global image statistics and a simple method of noise estimate were used to derive parameters. These were used in subsequent image-processing steps to enhance the quality of dim images and remove noise. Images with average brightness skip "Ln transformation", and the "Contrast enhancement" routine was only applied to images that exhibited low variance among their luminance values.

This method increases the grey value saturation and image contrast of underexposed grey-scale images as well as grey-scale frames of a movie by combining several different image processing steps (see FIG. 1). In the first step, a simple form of noise estimation is performed, and global image statistics are evaluated to calculate three parameters of this algorithm (the radius, gain, and variability threshold). Then luminance values (grey values) of pixels are computed at the level of so-called receptors (in the claims referred to as basic receptors; also see variable summed_grey of equation 7) that sum or average luminance values of pixels within a circle of a fixed radius.

After log transformation and amplification (multiplication using the gain, see equation 8) of these receptor values, an adaptive spatial averaging procedure is applied to remove noise to a great extent. This procedure evaluates the variability (i.e. variance) of local luminance values in a circle that expands as long as the statistical variance of luminance values of receptors remains below a threshold (variability threshold, threshold_var). After exceeding this threshold, the average luminance of the surrounding receptors is calculated. This adaptive averaging procedure is repeated for all receptors to remove image noise. If the resulting image has a low level of contrast, which is obvious by low global luminance variability, an automatic contrast-enhancement procedure can be applied.

I. Calculation of Model Parameters

A simple calculation of the global image statistics is performed and image noise is estimated to obtain three parameters of the algorithm (radius, gain, and variability threshold). This algorithm processes 8 bit grey-scale images with a luminance range between 0 (black) and 255 (white). The median and variance of the luminance values of all pixels were analyzed and saved as median_grey and var_grey, respectively. The parameter gain is derived from median_grey according to equation 1. A gain value smaller than 1 is set to 1.

$$\text{gain} = 128 - \text{median\_grey} \quad \text{Equation 1:}$$

Noise Estimation

A rather simple estimation of noise is obtained by summing up the differences between the luminance of each pixel and the average luminance values of surrounding pixels in rather homogeneous regions of the image. For this purpose, the local average luminance value (mean_grey_local) and local variance and/or standard deviation (the standard deviation yields better results for 256 grey scale values) of luminance values of surrounding pixels are calculated in a circle with a radius of 4 pixels (assuming an image resolution of about 600×600 pixels). X represents those pixels that belong to homogeneous image regions and were found according to equation 2. If mean_grey_local is smaller than the product of var_grey and median_grey, this pixel is located in a homogeneous image region, and it is taken into account for noise estimation. When brighter images served as input (median_grey>51), mean_grey_local of a pixel had to be smaller than the ratio between var_grey and median_grey to contribute to noise estimation.

$$X = \begin{cases} \text{mean\_grey\_local} < \text{var\_grey} * \text{median\_grey} & |\text{median\_grey} <= 51 \\ \text{mean\_grey\_local} < \dfrac{\text{var\_grey}}{\text{median\_grey}} & |\text{median\_grey} > 51 \end{cases} \quad \text{Equation 2}$$

Figure 2:
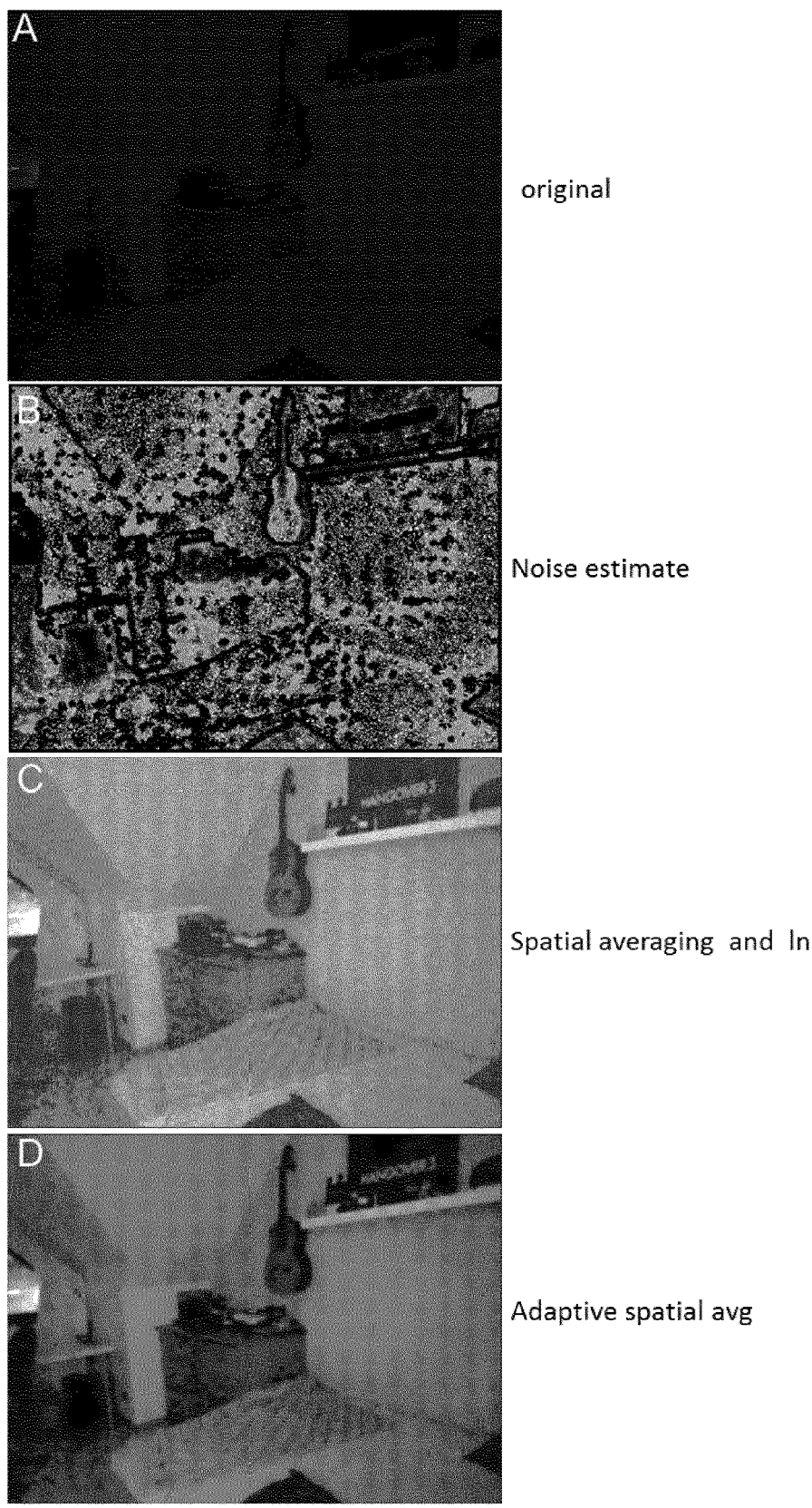
FIG. 2 Illustration of processing steps.

The noise estimate was computed according to equation 3 by averaging the absolute differences between mean_grey_local and the luminance value of pixels belonging to homogeneous image regions (N represents an element of X) (see FIG. 2 (B)).

$$\text{noise\_estimate} = \dfrac{\sum_{N=1}^{X} \text{abs}(\text{mean\_grey\_local} - \text{luminance})}{X} \quad \text{Equation 3}$$

The first pixel-wise operating spatial domain filter uses a fixed dimension of the circle in which the luminance values of surrounding pixels are summed. The radius of this circle is calculated using equation 4 and is based on the noise estimate and global image statistics. Its dimension is defined by the size of pixels.

$$\text{radius\_spatial\_summation} = \\ 0.35 * \ln\left(\dfrac{\text{median\_grey}}{\text{var\_grey}} * \text{noise\_estimate}\right) + 0.87 \quad \text{Equation 4}$$

Grid_size is a parameter that adjusts the distance r between 'receptors' and was derived from the radius of spatial summation by rounding it to the nearest integer number (Grid_size={1, 2, 3, 4 ..., N}; see equation 5). For low-resolution images (about 600×600 pixels) grid_size is typically either 1 or 2. When using images of higher resolution, the processing speed of the NV algorithm (the method according to the invention is also referred to herein as "night vision" algorithm, in short "NV algorithm") can be significantly improved by increasing grid size to the expense of the resolution of the output image. If the noise_estimate is lower than 2.6, grid_size should be low to prevent unnecessary image blur.

$$\text{grid\_size} = \begin{cases} \text{round(Radius\_spatial\_summation)} & |\text{noise\_estimate} >= 2.6 \\ 1 & |\text{noise\_estimate} < 2.6 \end{cases} \quad \text{Equation 5}$$

The threshold used for adaptive spatial averaging was calculated using equation 6 and is based on the global image statistics, gain and noise_estimate.

$$\text{threshold\_var} = \quad \text{Equation 6}$$
$$0.0002 * [(\text{noise\_estimate} + \text{var\_grey}) * \text{median\_grey}] + 0.9203 + \left(\frac{\text{gain}}{100}\right),$$

or alternatively in particularly for 256 grey scale values $$\text{threshold\_var} =$$
$$0.0002 * [(\text{noise\_estimate} + \text{var\_grey}) * \text{median\_grey}] + 0.92 + \left(\frac{\text{gain}}{10}\right)$$

If noise_estimate was smaller than 0.26, threshold_var was always set to 0.26 or 3 (for 256 grey scale values), which is low enough to preserve fine image details, but high enough to remove the remaining noise.

II. Image Enhancement Procedure

FIG. 2 illustrates the sequence of image processing steps that lead to the enhancement of image contrast and noise reduction.

Spatial Summation (For Color Images Each of the Color Channels Can be Calculated Separately)

To execute a spatial domain filter in the first image processing step, a regular grid consisting of "receptor" elements (namely basic receptors) are defined. Inter-receptor distance corresponds to the parameter grid_size. Each receptor summarizes the luminance values of neighboring pixels in a circle with radius_spatial_summation, whereby a radius of dimension 1-2 corresponds to 1-6 surrounding pixels (i in equation 7; note that the distance between directly neighboring pixels is assumed to equal 1; consequently selecting a pixel and determining the surrounding pixels within a radius 1, would yield 5 pixels, namely the pixel to the left and the right as well as the pixel above and the pixel below the selected pixel, including the selected pixel). If the median luminance value of the input image (median_grey) was higher than 25.6, the luminance values of surrounding pixels were averaged rather than summed to prevent image glare.

$$\text{summed\_grey} = \begin{cases} \sum_{i=1}^{N} \text{luminance} & |\text{median\_grey} <= 25.6 \\ \dfrac{\sum_{i=1}^{N} \text{luminance}}{N} & |\text{median\_grey} > 25.6 \end{cases} \quad \text{Equation 7}$$

Logarithmic Transformation

In the event that gain succeeds 25.6, the contrast of dim images (gain>25.6) was enhanced by logarithmic transformation of receptor values. This was achieved by calculating the natural logarithm of the summed_grey values of receptors and multiplication of the result by the gain factor (see equation 8). The result of this logarithmic transformation was stored as greyLn at the focal receptor. Adding the constant 1.5 to the grey values prevents them from becoming smaller than zero.

$$\text{greyLn} = \ln(\text{summed\_grey} + 1.5) * \text{gain} \quad \text{Equation 8:}$$

For images having 256 grey scale values the result of equation 8 can be preferably divided by 3.

Adaptive Spatial Averaging

Image noise is removed by means of 'adaptive spatial averaging', a procedure that evaluates the local variability of the greyLn values of receptors to calculate the radius of the circle (which is referred to in the claims as distance r) in which spatial averaging is executed at the level of receptors. For this purpose, each receptor expands a circle in steps of one pixel (or grid_size; the distance r (namely the radius of said circle) being initial set to an initial start value, preferably initially r=1) as long as the variance of greyLn values of receptors (i.e. basic receptors) within this circle (N) remains below threshold_var. The variance is the sum of the squares of the deviations of the numbers from their mean, divided by one less than the number of numbers of receptors. Once the dimension of this circle is found (i.e. the distance r was increased until the variance of the basic receptor values succeeded the threshold), the greyLn values are averaged and saved as greyAvg values for each receptor (see equation 9), yielding the so called averaged receptors. The maximum radius of the expanding circle is restricted to the dimension of 10 pixels and the minimum to one pixel. The dimension of the circle can be saved as RF-radius for the calculation of image sharpness in the next processing step.

$$\text{greyAvg} = \dfrac{\sum_{i=1}^{N} \text{greyln}}{N} \quad | \text{variability}(\text{greyLn}) < \text{threshold\_var} \quad \text{Equation 9}$$

The contribution of spatial domain image filtering to denoising is illustrated in FIG. 2. In the event that the average luminance value of the input image does exceed 25.6, the values greyAvg would be calculated based on the values summed_grey, i.e. the step of equation 8 would be skipped and equation 9 would state:

$$\text{greyAvg} = \dfrac{\sum_{i=1}^{N} \text{summed\_grey}}{N} \quad | \text{variability}(\text{summed\_grey}) < \text{threshold\_var}$$

For color images, the following can be taken into consideration: The variability of the averaged greyLn values of all colors of surrounding receptors (or patches, i.e. pixels) can be used to calculate the radius of the circle in which spatial averaging is executed separately for each color channel.

Enhancement of Image Contrast

S is the set of greyAvg values of receptors. If the variance among S is lower than 77, preferably lower than 75, image contrast is low. In this case, image contrast is enhanced in two subsequent steps. First, the lowest greyAvg value of all receptors was subtracted from the greyAvg values of all receptors (equation 10).

$$greyAvg = greyAvg - \min(S) \quad \text{Equation 10:}$$

Second, the histogram of grey values was stretched using equation 11 that multiplies each greyAvg value by 255 and divides the product by a term that is derived from the statistics of S. The resulting greyHist value was saved for each receptor. In equation 11 mean_80 is the average of greyAvg values that are less than 20% of the maximum greyAvg value (equation 12), and mean_20 is the mean of the remaining high greyAvg values (equation 13).

$$greyHist = greyAvg * k = \left( \frac{greyAvg * 255}{\text{mean\_80} + \left(\frac{\text{mean\_20} - \text{mean\_80}}{1.5}\right)} \right) \quad \text{Equation 11}$$

$$\text{mean\_80} = \frac{\sum_{i=1}^{N} greyAvg}{N} \quad | \, greyAvg < \max(S) * 0.8 \quad \text{Equation 12}$$

$$\text{mean\_20} = \frac{\sum_{i=1}^{N} greyAvg}{N} \quad | \, greyAvg > \max(S) * 0.8 \quad \text{Equation 13}$$

Image Display and Grey Value Interpolation

If grid_size is 1, every pixel possesses a corresponding receptor, and the greyHist values or greyLn values of receptors refer to the luminance of the corresponding pixel. If receptors are separated by 1 or more pixels (grid_size>=2), the mean of the greyHist values or greyLn values of neighboring receptors can be averaged to calculate the grey value of pixels that lack a receptor. For this purpose, each receptor stores its greyHist value (or greyLn value) to a list variable of surrounding pixels (within a circle of radius grid_size—0.5). Then, the average of this list is calculated at the level of pixels, and the result corresponds to the luminance values of the pixels (see equation 14).

$$\text{luminance} = \frac{\sum_{i=1}^{N} greyHist}{N} \quad | \, N = \text{pixels in radius grid\_size} - 0.5 \quad \text{Equation 14}$$

The result of the interpolation of pixels based on the averaged receptors according to equation 9 or 10 represents an enhanced grey scale image according to step e) of claim 1.

In other words, the method according to the present invention can be described as follows:

Method for processing of a grey scale image, in particular a dim grey scale image, comprising the following steps:

a) receiving an initial grey scale image, said initial grey scale image having a plurality of pixels at an initial resolution, b) calculating parameters characterizing the luminance (gain, median_grey, var_grey) and the noise level (X, noise_estimate, radius_spatial_summation, grid_size, threshold_var) of the initial grey scale image of step a), c) creating a basic intermediate image, said basic intermediate image having a plurality of basic receptors (summed_grey) at a calculated resolution that is equal or lower than the resolution of the initial grey scale image, wherein each basic receptor (summed_grey) represents a number of corresponding pixels of the image of step a) by mapping the number of pixels to a basic receptor (summed_grey), and wherein the number of pixels to be mapped to a basic receptor (summed_grey) is derived from the parameters of step b), and wherein the number of basic receptors (summed_grey) is derived in dependence of the number of pixels of the initial grey scale image and in dependence from the parameters of step b)

d) creating an averaged intermediate image, said averaged intermediate image having a plurality of averaged receptors (greyAvg) at a resolution essentially similar to the resolution of the basic intermediate image of step c), wherein the averaged receptors (greyAvg) are calculated by applying adaptive spatial averaging on the intermediate image of step c), wherein adaptive spatial averaging comprises the steps d1) selecting a basic receptor of the intermediate image, wherein the distance r between directly neighboring basic receptors (summed_grey) is set to an initial value, preferably r=1, d2) calculating the deviation of basic receptors (variance (greyLn), variance(summed_grey)) that are arranged within a distance r with regard to the selected basic receptor (summed_grey), d3) comparing the deviation (variance(greyLn)) calculated in step d2) with a threshold (threshold_var) derived from the parameters of step b), and increasing the distance r in case the calculated deviation does not exceed the threshold (threshold_var), d4) iteratively repeating steps d2 to d3 until the deviation calculated (variance(greyLn)) in the previous step d3) exceeds the threshold (threshold_var), and d5) averaging the selected basic receptor based on the basic receptors (summed_grey) that are arranged within the previously set distance r, yielding an averaged receptor (greyAvg) of the averaged intermediate image, wherein steps d1 to d5 are applied on each basic receptor (summed_grey) of the basic intermediate image, e) creating an enhanced grey scale image by interpolation of pixels based on the averaged receptors (greyAvg) of the averaged intermediate image of step d).

In particular, the number of basic receptors (summed_grey) can be calculated as follows:

$$N_{rb} = \frac{1}{\text{grid\_size}^2} N_{pi},$$

wherein $N_{rb}$ is the number of basic receptors, $N_{pi}$ is the number of Pixels of the initial grey scale image, grid_size is a natural number, and grid_size is in the range of grid_size≥1, wherein the value of grid_size is derived from the parameters of step b).

III Evaluation of Performance

The performance of this algorithm was evaluated by calculating the Peak-Signal-to-Noise-ratio (PSNR) using the method described by Russo (2004). The result is given in dB and quantifies the difference between the noisy input image and the processed image (see table 1).

Results

Figure 3:
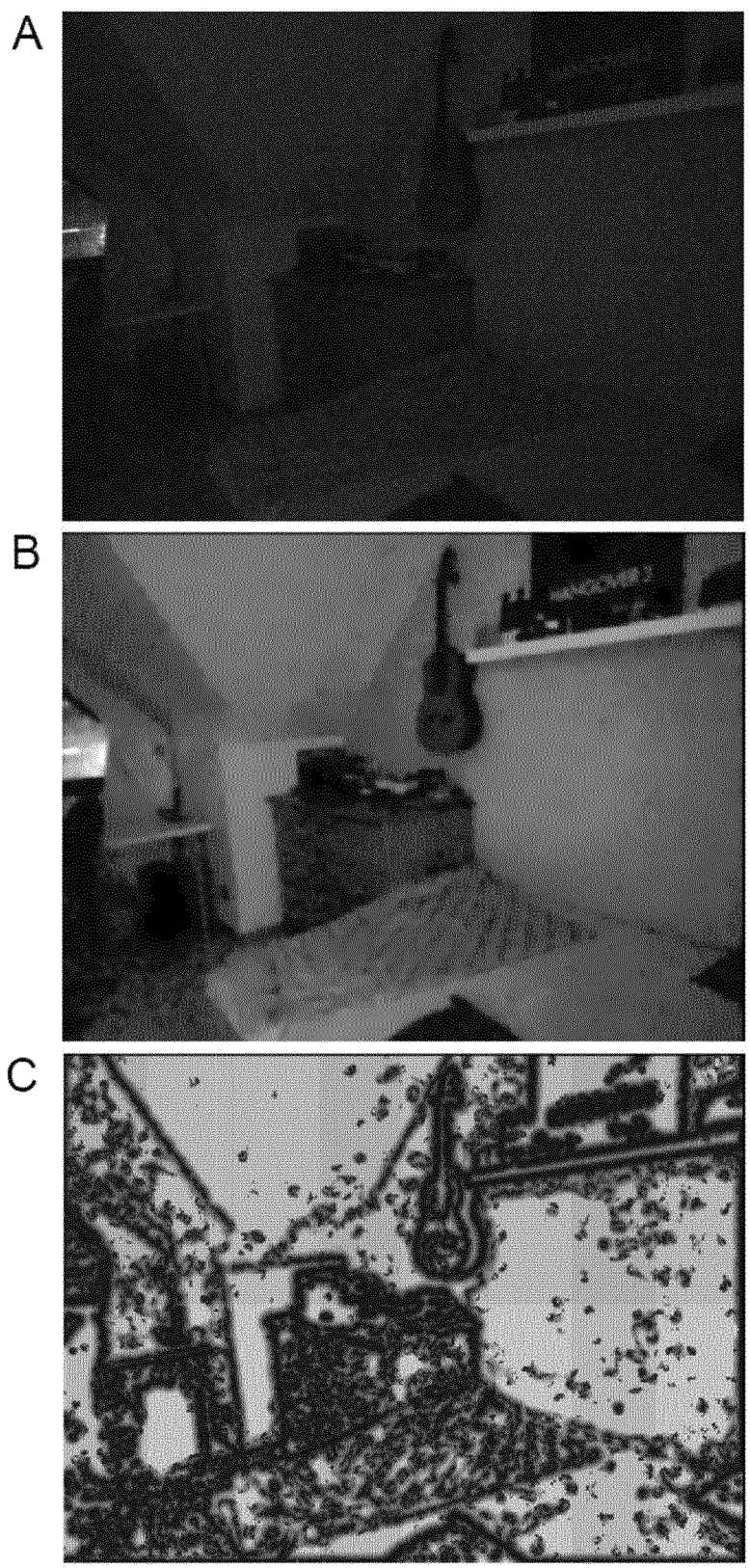
FIGS. 3 to 12 show further exemplary images demonstrating and comparing images resulting from processing according to the present invention.
Figure 4:
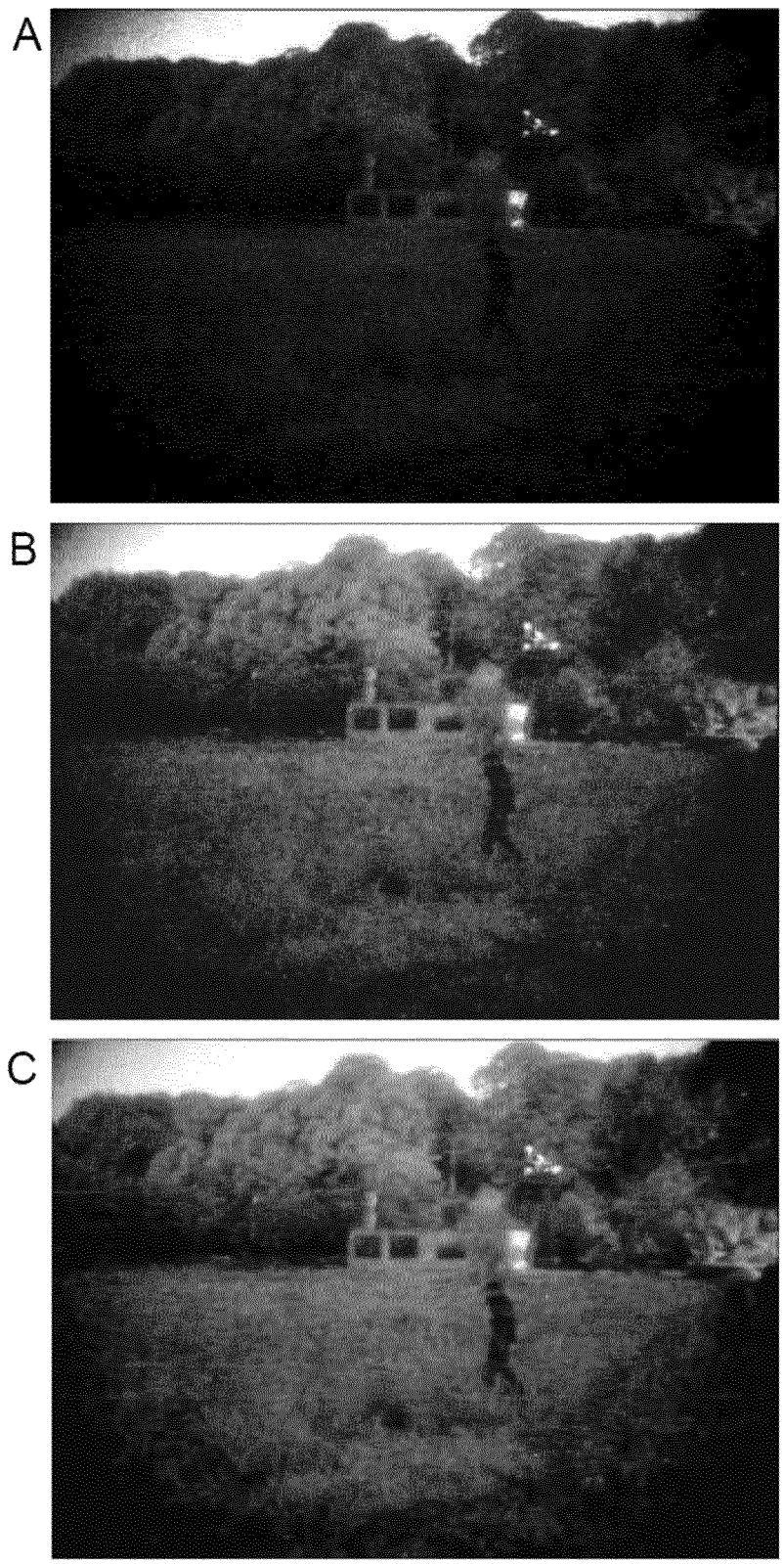

The sequence of image-processing steps illustrated in FIG. 1 allowed the strong enhancement of the image contrast in dim images and simultaneously suppressed sensor noise. Application of this algorithm to dim images obtained from a mobile phone camera (FIG. 3A) and an image-intensified TV camera (FIG. 4A, from Chen & Blum 2005) resulted in the production of images with a high level of contrast, such that objects in dark regions of the image were clearly visible in the processed image (the back of a chair, the PC below the table in FIG. 3B (the NV algorithm had been applied on FIG. 3B, therefore FIG. 3B shows an example of an enhanced grey scale image according to step e) of the method according to the present invention), and the person in the meadow shown in FIG. 4B (the NV algorithm had been applied on FIG. 4B, therefore FIG. 4B shows an example of an enhanced grey scale image according to step e) of the method according to the present invention)). The adaptive spatial averaging procedure preserved image details and object contours, while most noise was removed (see noise suppression, illustrated in figure S2. The false-color FIG. 3C illustrates the size of the circle in which neighboring luminance values were averaged during execution of this procedure. Darker image regions refer to circles for which the diameter was small, whereas bright areas indicate larger circles with a maximum radius of 10 patches. Note that the circle diameters in which spatial averaging was preformed remained small near object contours, whereas the diameter was large in homogeneous regions of the image. The performance of the NV algorithm was quantified by calculating the PSNR between the noisy input image and its corresponding output. Table 1 summarizes the PSNR values that were obtained for all images that are shown in the figures of this study. PSNR values ranged from 24 dB to 53 dB.

Figure 5:
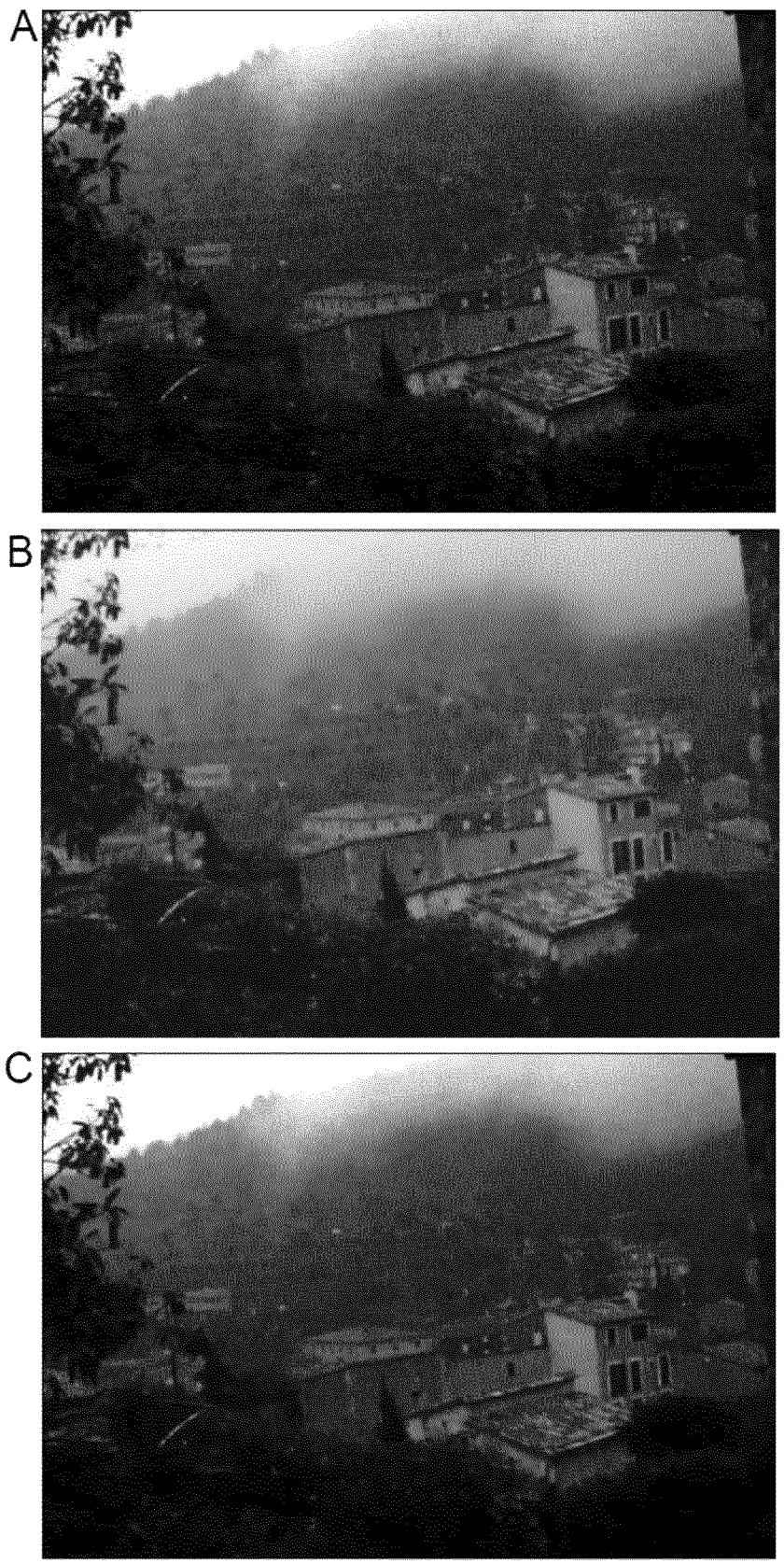

The dim and noisy images obtained from an analog night vision camera (from Chen and Blum 2005), shown in FIG. 4A, were used as input for the NV algorithm and the highly developed BM3D algorithm, which is based on block matching and 3D filtering (Dabov et al. 2006; http://www.cs.tut.fi/~foi/GCF-BM3D/). Surprisingly, the output of the NV algorithm (i.e. according to the method of the present invention; FIG. 4B) is comparable to the output of the BM3D algorithm (FIG. 4C). The PSNR value is even higher for the NV algorithm (NV: 35.5 dB) compared to the BM3D method (30.0 dB). FIG. 5A shows a noisy natural image of a village on Mallorca. The NV algorithm removed noise and simultaneously enhanced image contrast (FIG. 5B), which revealed image details such as a hedge in the foreground (PSNR: 38.1 dB). However, the mist in the background of the image merged with the bright sky. In comparison, denoising performed with an improved non local mean algorithm published by Buades et al. (2005) removed noise (see FIG. 5C; PSNR: 41.1 dB), but details in the dark foreground still remained obscure.

Figure 6:
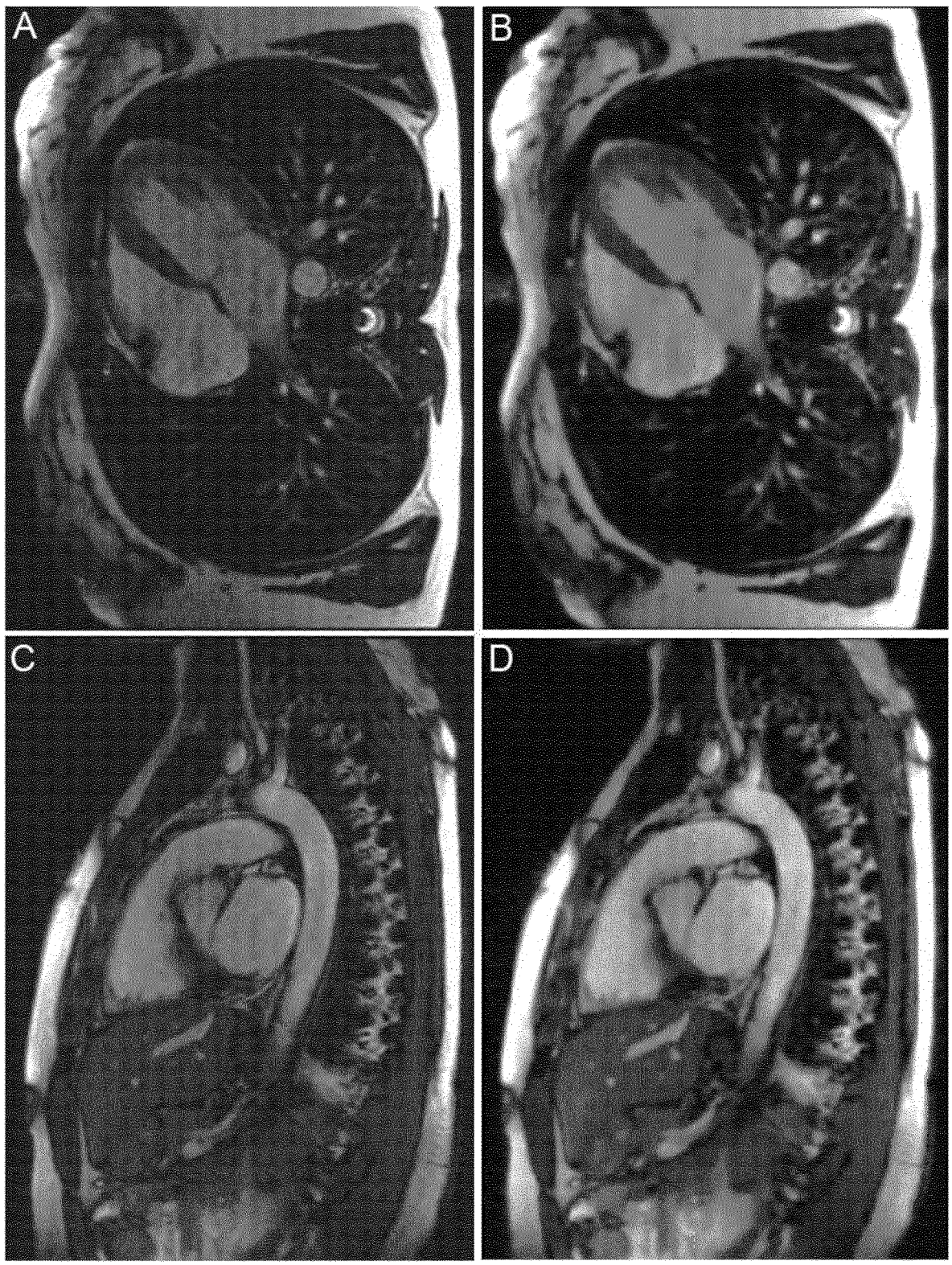

Since this NV algorithm can be used to greatly enhance the contrast of dim images, it can also be used to enhance the quality of diagnostic images, where structures in dim regions of the image often remain obscure. Application of the NV algorithm significantly enhanced the contrast of the CT images shown in FIGS. 6A and 6C and simultaneously removed noise that would have been amplified after simple histogram stretching (FIGS. 6B, D). The lung parenchyma in the processed image exhibits a much higher contrast in FIG. 6B as compared to the input image, and small dorsal lymph nodes are more clearly visible in FIG. 6D (ventral to the spinal cord). However, the image-contrasting procedure (see methods) described in the methods section led to the expansion of bright structures and an increase in the level of their glare.

Figure 7:
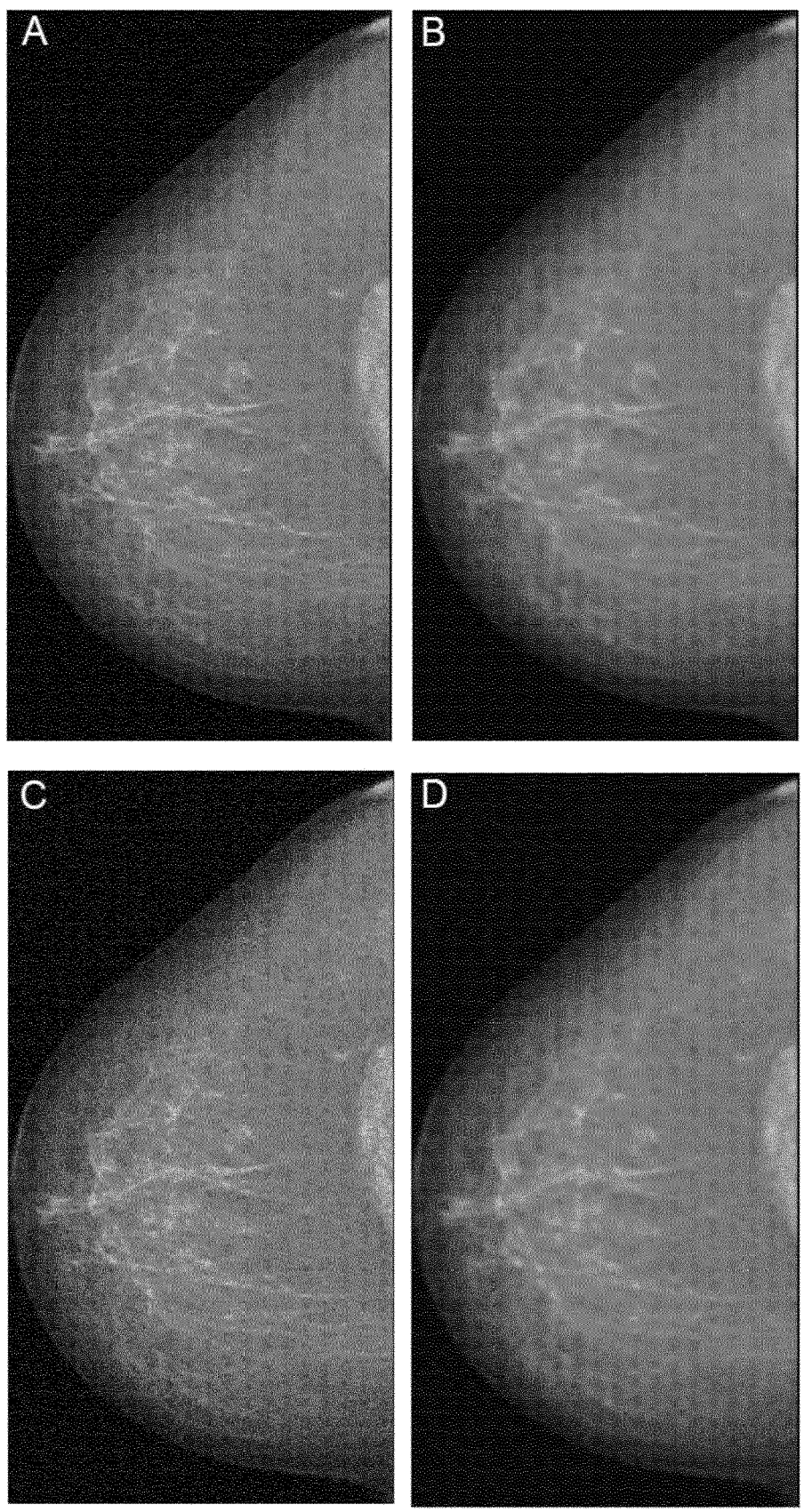

To demonstrate the denoising performance of the NV algorithm, various test images with different degrees of noise were used as inputs for the NV algorithm. Application of this algorithm to a mammography image with Gaussian-distributed noise of standard deviation ($\sigma$) 3% (FIG. 7A) and 5% (FIG. 7C) removed noise and enhanced image contrast such that the mammary ducts became more clearly visible (see FIGS. 7B, D). As a side-effect of denoising, the image blur increased slightly. Due to the presence of large black region that contained no information except noise, it was necessary to adjust the threshold_var manually.

Figure 8:
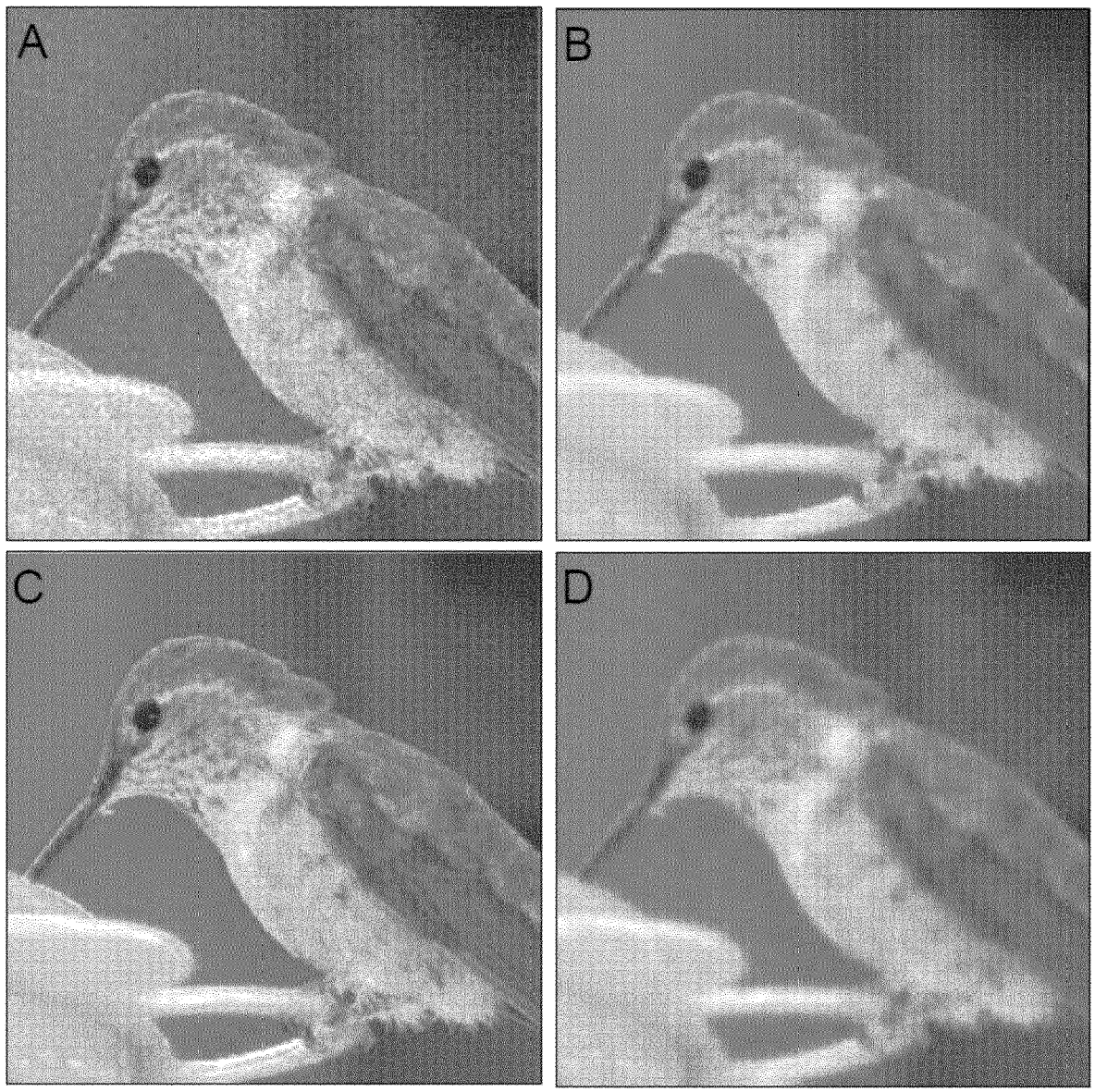

The next figures illustrate the denoising performance of the NV algorithm by comparing it with several other powerful denoising algorithms. Gaussian distributed noise with $\sigma=12.75$ was added to an image of a bird (FIG. 8A). Although the noise in this image was substantial (compare FIG. 8A with the noise-free image shown in 8C), the NV algorithm removed noise while retaining many fine image details (FIG. 8B). In contrast, the application of a method that is based on the moving least squares (MLS) algorithm described by Lee et al. (2014) resulted in the production of a blurry image (FIG. 8D). This difference in denoising performance is mirrored in the PSNR values, which were slightly higher for the NV algorithm (46.2 dB) as compared to those for the MLS algorithm (41.3 dB).

Figure 9:
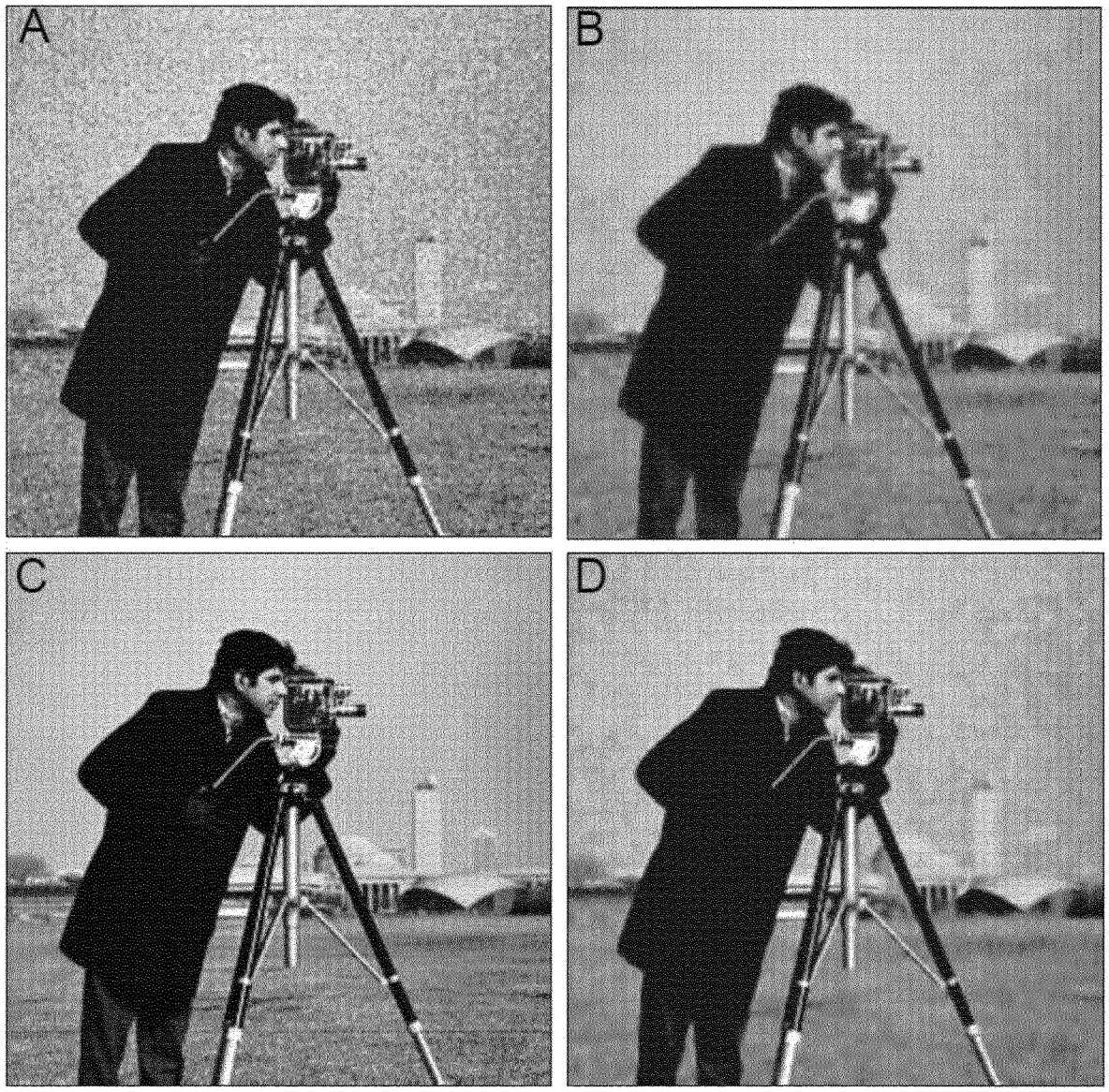
Figure 10:
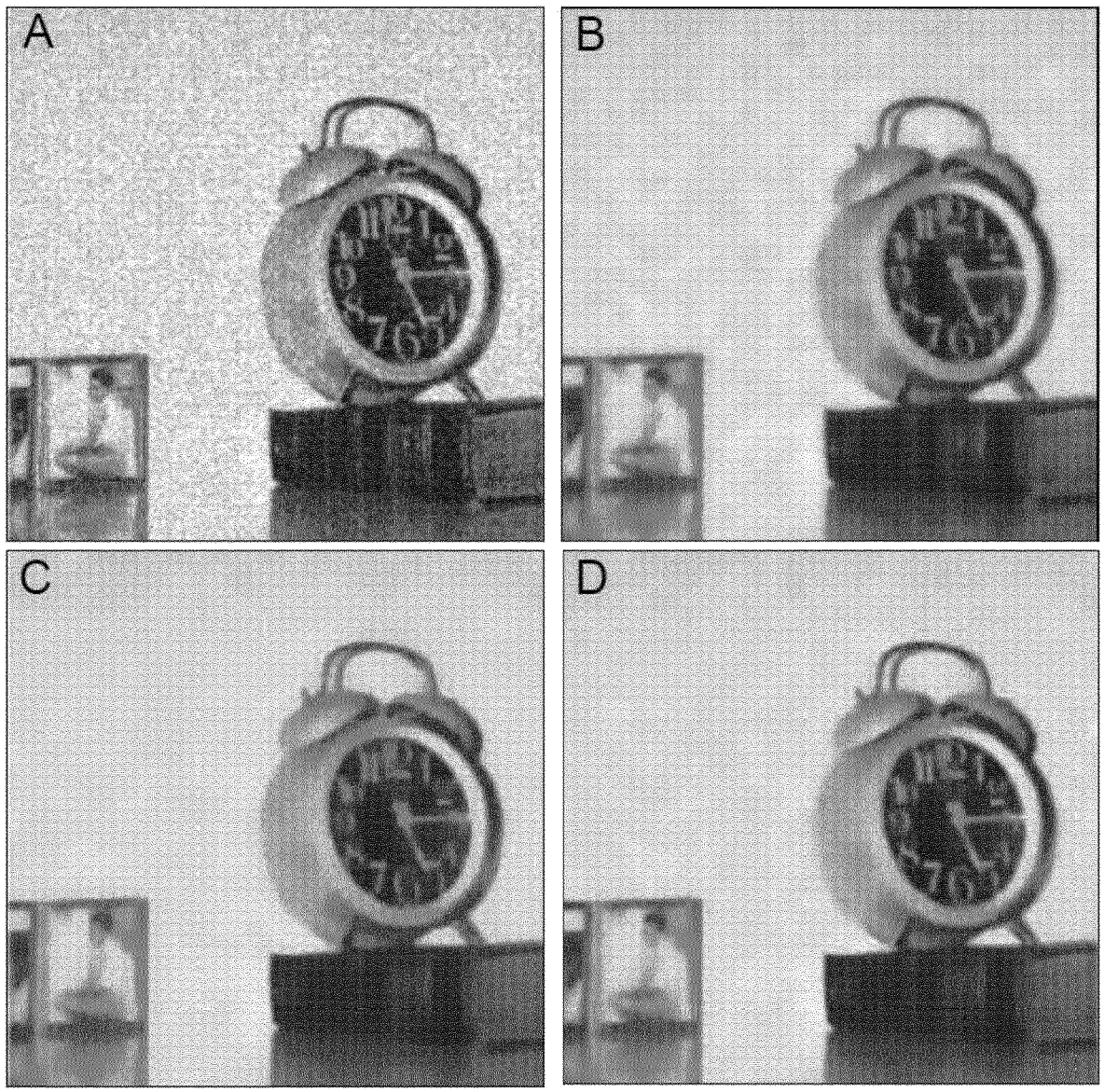

The denoising performance of the NV algorithm was also compared with that of the MLS denoising algorithm with total variation minimizing regularization described by Lee and Yoon (2013) by applying both algorithms to a very noisy image of a cameraman (FIG. 9A; $\sigma=20.4$). Both algorithms removed noise successfully (NV: 9B and MLS: 9D), but some details in the background of denoised images vanished (e.g., the smaller skyscraper on the right side of FIGS. 9B and 9D), and the sky in the background showed some inhomogeneity (compare filtering results with the noise-free image in FIG. 9C). The PSNR value was higher when the NV algorithm was used (45.9 dB) as compared to when the MLS algorithm was used (41.6 dB). Finally, the denoising performance of the NV algorithm was compared with that of the adaptive total variation minimization-based image enhancement method (ATVM) described by Yoon et al. (2014) and the bilateral TV filter described by Wang et al. (2007). The noisy image used for this purpose is shown in FIG. 10A and contains additive white Gaussian noise ($\sigma=0.6$). The application of the bilateral TV filter successfully removed the noise (FIG. 10C), but fine details such as the clock face were better preserved when the ATVM method was used for denoising (FIG. 10D). The output image of the NV algorithm was very similar to the ATVM-processed image, which is also mirrored by the similar PSNR values (NV algorithm=46.5 dB; ATVM: 47.5 dB). The background is less homogeneous in the NV-processed image (FIG. 10B) than in the ATVM-processed image.

Figure 11:
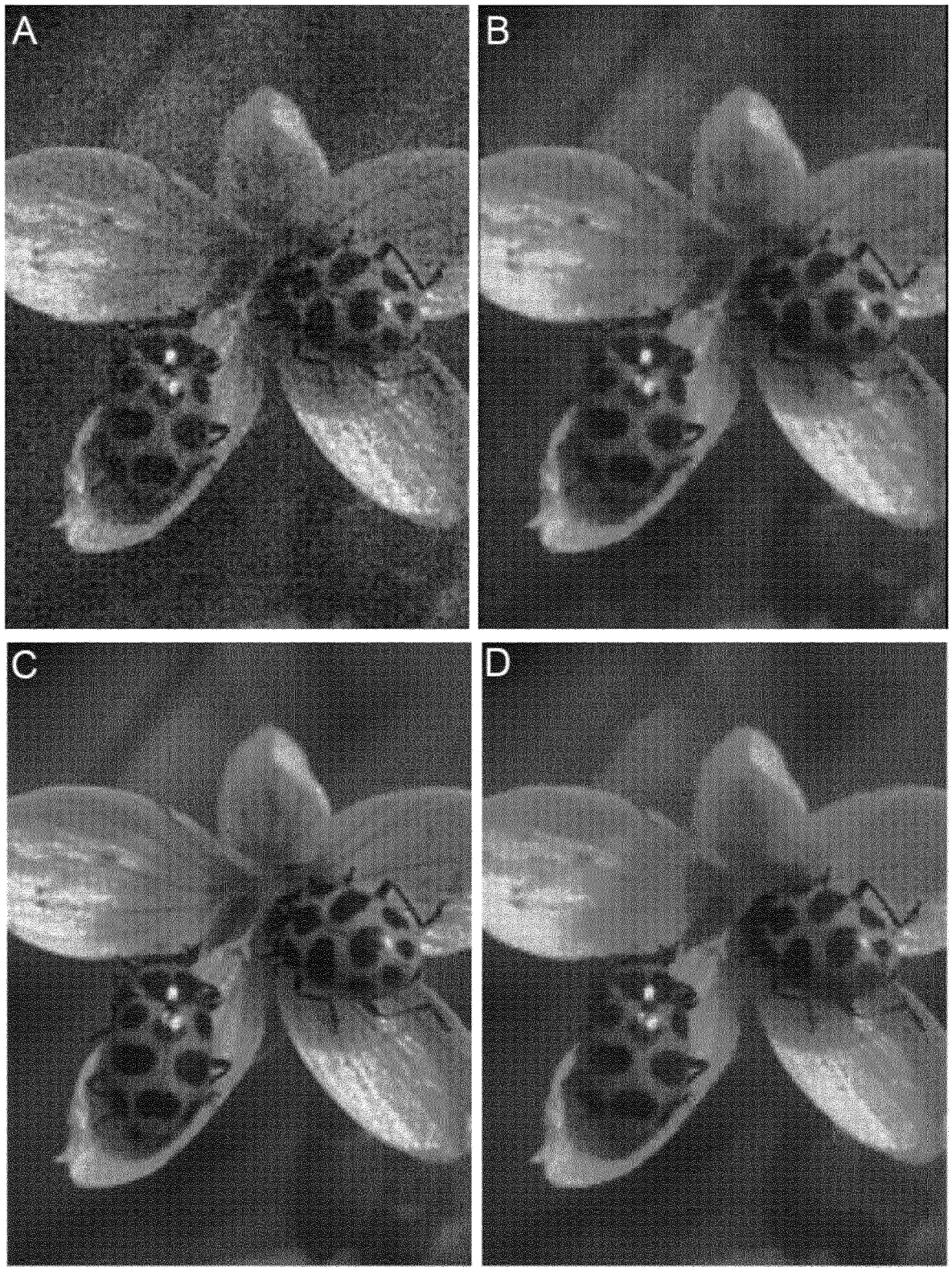

The performance of the NV algorithm was also compared with the performance of the denoising algorithm of Liu et al. (2008), which was developed to remove real CCD camera noise from color images. This method is used to calculate the noise level function (NLF), which is a continuous function that describes the noise level as a function of image brightness and constructs a Gaussian conditional random field (GCRF) to extract the underlying, clean image from the noisy input. FIG. 11B shows the output of the NV algorithm when the greyscale image shown in FIG. 11A served as input. The result of denoising the original color image by Liu et al. (2008) is shown in FIG. 11D. A comparison of FIG. 11B with 11D leads one to conclude that a better denoising result is obtained using the denoising algorithm of Liu et al., but some image details were lost (veins on the petals of the flower). Therefore, the PSNR value of the NV processed image was slightly higher (50.0 dB) as compared to the PSNR value obtained using the color-denoising algorithm (48.0 dB).

Figure 12:
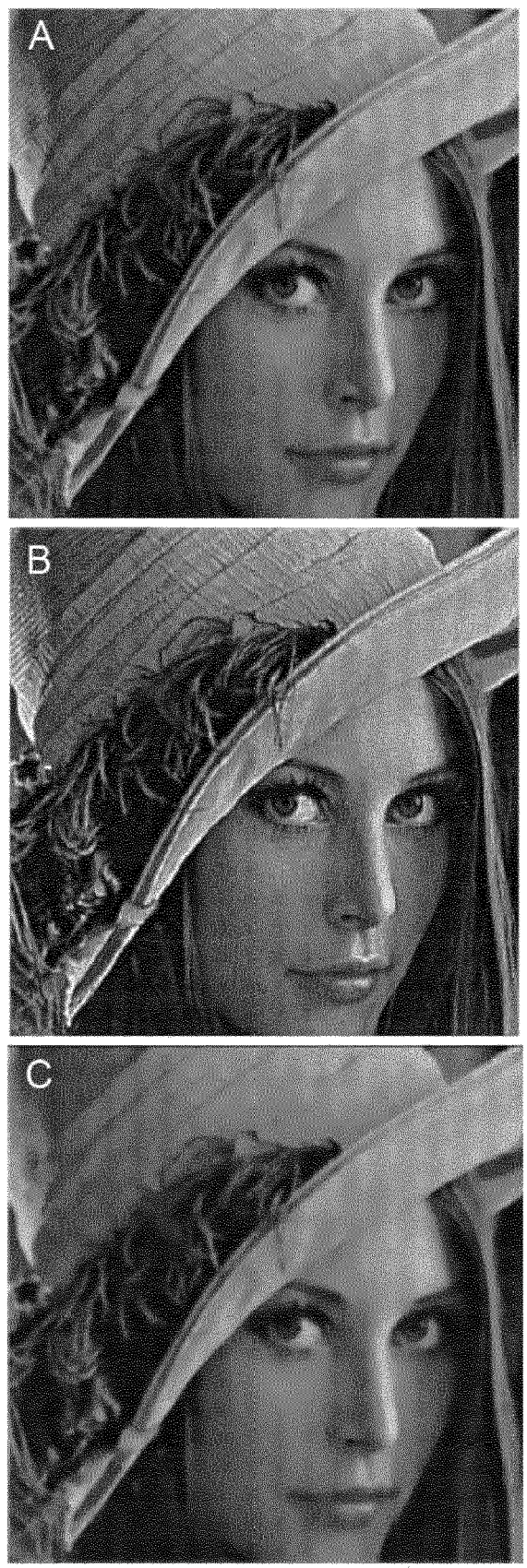

Finally, the performance of the NV algorithm was compared with the image enhancement achieved using adaptive unsharp masking (AUM) as described by Polesel et al. (2000). This sharpening algorithm adjusts sharpening so that contrast enhancement occurs in high detail areas, and little or no image sharpening occurs in smooth areas. The portrait of a woman (Lena) shown in FIG. 12A contains some noise that was strongly amplified when the AUM algorithm was used (FIG. 12B). In contrast, noise was successfully removed using the NV algorithm (FIG. 12 C), but at the expense of sharpness. The PSNR values for the output images were very similar (NV algorithm: 49.2 dB, AUM: 50.0 dB).

FIG. 15 discloses a schematic diagram of a night vision device for vehicles. Therein, a camera can be equipped with a sensitive sensor, subsequent frames can be summed using an image processor, dim frames are enhanced using the NV algorithm that can run on a FPGA chip or image processor. The output can be displayed on a screen.

FIGS. 16 and 17 disclose schematic diagram of drones. Therein a drone comprises a camera equipped with a sensitive (optical) sensor. Subsequent frames can be summed using an image processor, dim frames are enhanced using the night vision algorithm that can run on a FPGA chip or image processor. The output can be transmitted to a receiver and displayed on a screen. The drone according to FIG. 16 differs from the drone according to FIG. 16 by the arrangement of the components carrying out the method according to the present invention. The drone according to FIG. 17 sends images to a receiver, wherein the receiver applies the NV algorithm on the received image and transfers the results

TABLE 1

Image statistics and parameter settings (in the images according to FIG. 3 to FIG. 12 the luminance values of the pixels were within a range of 0.0 to 9.9, wherein 0.0 represents black and 9.9 represents the brightest luminance value).

| Figure number | Name | Pixels | Median luminance | Max luminance | Luminance Variance | Noise estimate | Radius spatial summation | Threshold_var | Performance PSNR [dB] |
|---|---|---|---|---|---|---|---|---|---|
| 3 | Room | 187875 | 0.2 | 5.3 | 0.02 | 0.03 | 1.7 (6) | 0.08 | 30.1 |
|   | Guitar | 171031 | 0.5 | 3.6 | 0.13 | 0.16 | 1.9 (6) | 0.08 | 24.2 |
| 4 | Night vision | 266409 | 0.4 | 9.9 | 3.34 | 0.14 | 0.6 (1) | 0.09 | 35.5 |
| 5 | Valley | 257231 | 1.0 | 9.9 | 3.89 | 0.16 | 0.9 (1) | 0.10 | 38.1 |
| 6A | Cardiac | 120701 | 1.2 | 9.9 | 3.90 | 0.17 | 1.0 (4) | 0.01* | 35.7 |
| 7A | Mammography | 97837 | 3.4 | 7.9 | 4.72 | 0.23 | 1.4 (4) | 0.01* | 53.7 |
| 8 | Bird | 309135 | 5.4 | 5.4 | 3.10 | 0.18 | 1.6 (6) | 0.15 | 46.2 |
| 9 | Camera man | 309135 | 6.4 | 9.9 | 8.30 | 0.30 | 1.5 (6) | 0.37 | 45.9 |
| 10 | Alarm clock | 322623 | 8.5 | 9.9 | 7.50 | 0.24 | 1.5 (6) | 0.43 | 46.5 |
| 11 | Blossom | 326181 | 2.6 | 9.7 | 3.03 | 0.24 | 1.4 (4) | 0.10 | 50.0 |
| 12 | Woman | 361201 | 3.2 | 8.7 | 4.62 | 0.16 | 1.2 (4) | 0.13 | 49.2 |

*indicates manual adjustment of this parameter. The numbers in brackets refer to the number of pixels of the circle that were used in the first spatial averaging routine.

FIGS. 13 to 19 show different exemplary applications of the present invention.

Figure 13:
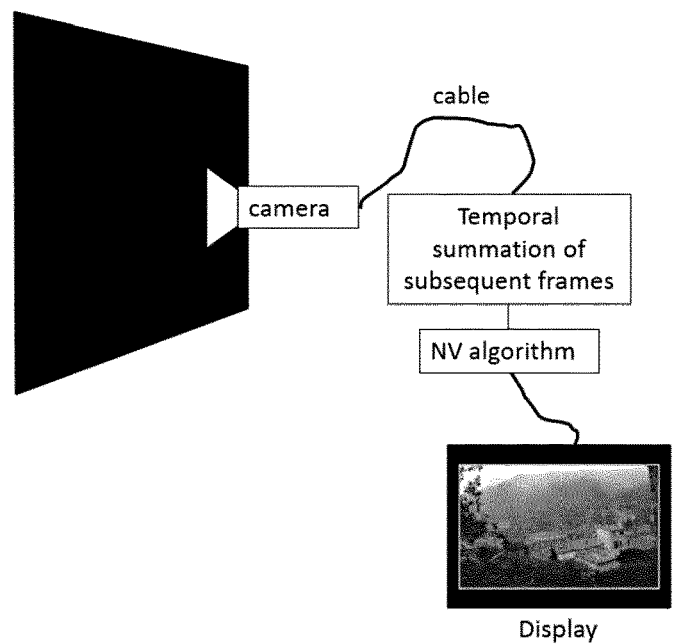

FIG. 13 shows a schematic diagram of a surveillance system using the method according to the present invention, said method is also referred to as "NV algorithm". The camera provides a sequence of images which can be processed by the NV algorithm. The resulting processed images can be stored, transmitted (wireless or via cable) or displayed. The method according to the present invention can also be applied on a plurality of images. Subsequent frames (i.e. images) can be summed using an image processor (this can be performed by the camera as well). In case a sequence of following images share similar characterizing image parameters, which is common in case the camera is not moving and the images are taken within a short period of time, it is possible to use the characterizing image parameters of a previous image and therefore to skip the calculation of step b) when processing a following image. This allows further reduction of processing power when applying the method according to the invention.

Figure 14:
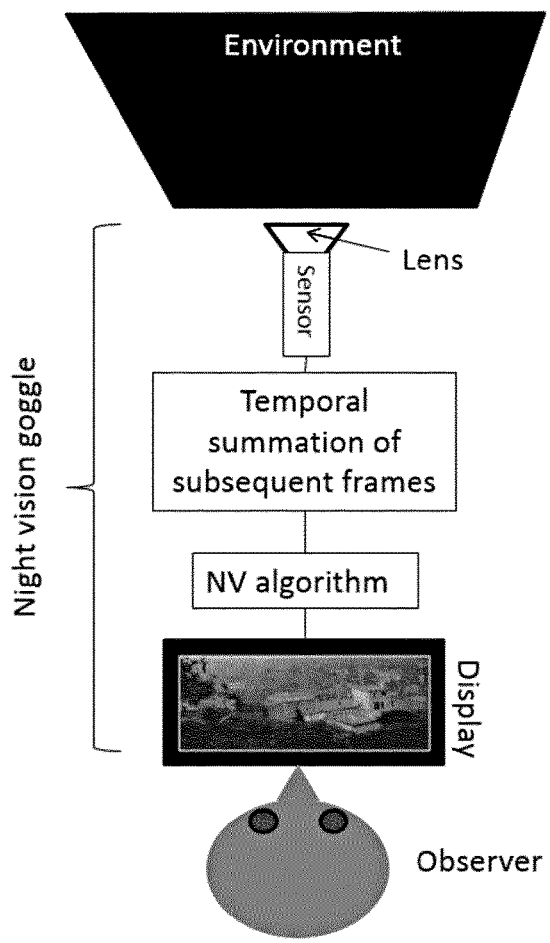

FIG. 14 discloses a schematic diagram of a wearable night vision device. A camera can be equipped with a sensitive sensor, subsequent frames can be summed using an image processor, dim frames are enhanced using the NV algorithm that can run on a FPGA chip or an image processor. The output can be shown on a wearable display to an observer.

of the processed image to a display. It is obvious for a person skilled in the art that different aspects, steps, and/or devices according to the present invention can be performed by a single device or by a network of devices.

Figure 18:
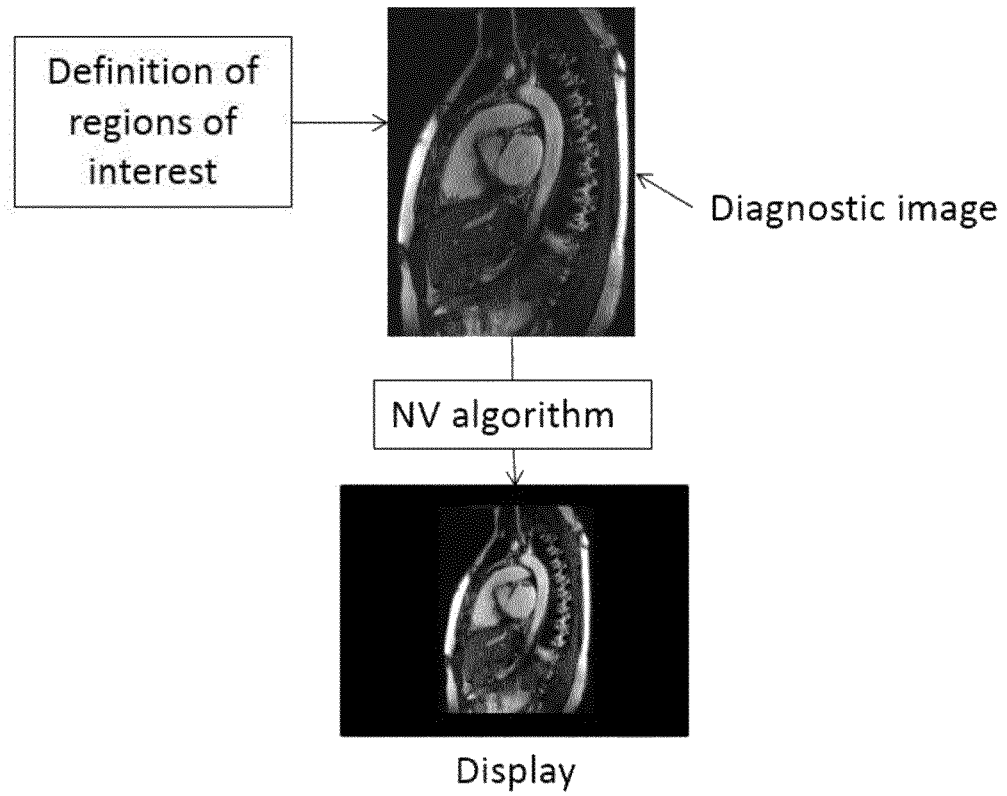

FIG. 18 discloses a schematic diagram of another application of the present invention, namely its use for the enhancement of diagnostic images. Therein, if applicable, region of interests (ROI) can be defined in a diagnostic image to crop areas containing no information, dim image regions within the ROI can be enhanced using the NV algorithm (i.e. the method according to the present invention) that can run on a FPGA chip, image processor or high performance computer. The output can be displayed on a screen.

Figure 19:
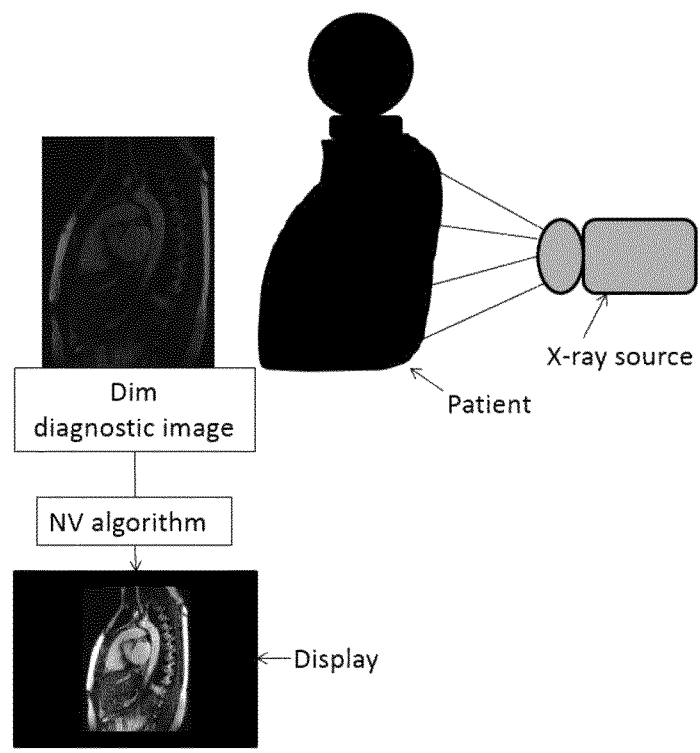

FIG. 19 discloses a schematic diagram of yet another application of the present invention, namely its use for the enhancement of diagnostic images. Therein, low intensity X-ray of a human body can be performed, and image enhancement using the NV algorithm that can run on a FPGA chip or image processor can be performed on the diagnostic image provided by the low intensity X-ray, that is usually dim. The output can be displayed on a screen. In this application, the present allows to reduce the intensity of X-ray while providing images having sufficient contrast and low noise level.

IV Further Enhancements

The enhancement of images yielded by embodiments of the invention described in chapter I to III can be further improved by another method referred to as "image-fusion". This step will be described in detail within the present chapter IV.

Figure 20:
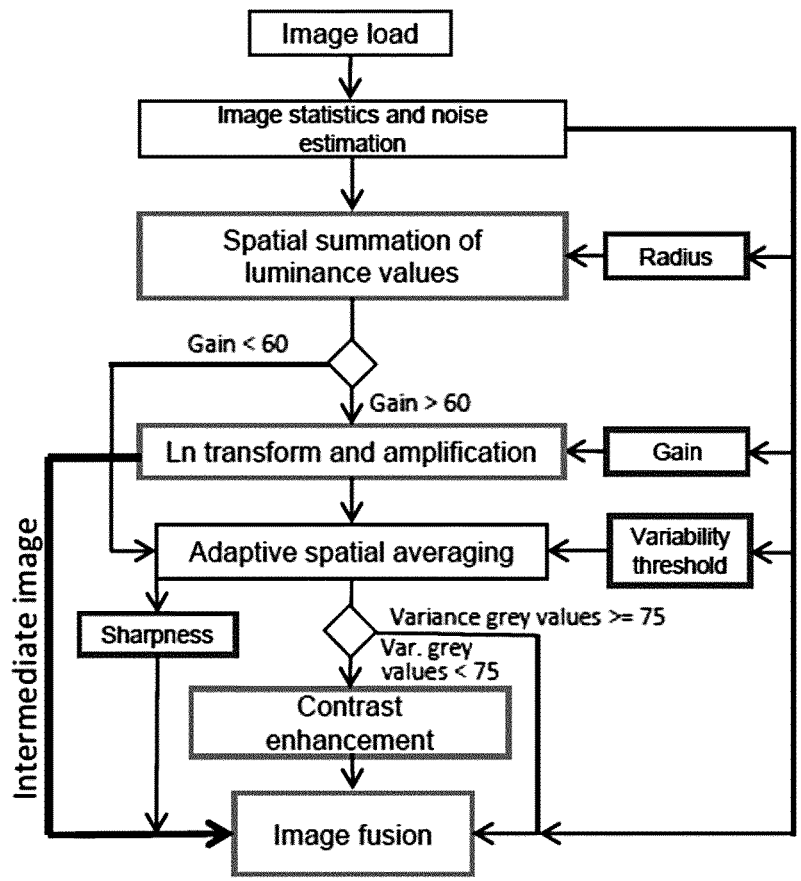
FIG. 20 shows a schematic overview of processing steps in an enhanced method according to the present invention.

Basically, an intermediate image yielded by the aforementioned steps "spatial averaging" or "Ln-Transformation" will be mixed with a final image (according to the following Equations 15 and 17 to 19). Therein, the steps "Estimating image sharpness" and "Enhancement of image contrast" will be carried out before in a final step "image fusion" can be performed. FIG. 20 gives a schematic overview of the enhanced method.

Estimating Image Sharpness

Image sharpness can be improved by fusing the intermediate image and after improving image contrast (see below). The merging factor used for image fusion depends on the sharpness of the filtered image. The sharpness of images can be estimated by counting the number of patches where sharp object contours resulted in a high luminance contrast between local patches. Since a high contrast is mirrored in a small RF_radius of only one or two pixels, it is possible to estimate image sharpness by counting the number of pixels that are surrounded by more than two pixels (in a radius of two patches) where RF-radius is not higher than two patches. To take image size into account, the sum of patches was divided by the total number of pixels of the image (see equation 15). Note that pixels and patches have the same dimension.

$$sharpness = \frac{\sum_{i=1}^{z} pixels(RF\_radius \leq 2)}{total\ pixels} \quad \text{Equation 15}$$

Enhancement of Image Contrast

A low image contrast of the processed image was reflected in the low variance among greyLnAvg values averaged across all color channels (mean greyLnAvg<75). Image contrast was enhanced by means of linear histogram stretching, which uses the lowest and highest mean greyLnAvg values of the image to calculate the resulting grey value of each pixel (greyHist1,2,3). If the input image exhibits bright regions with high grey levels (e.g. the bones in diagnostic images), image contrast can be enhanced by the image enhancement method described above. Alternatively, the contrast of images can be stretched by using equation 16, which sets the lowest value to 0 (black) and the highest value to 255 (white) while intermediate values are assigned to shades of grey.

$$greyHist1, 2, 3 = \frac{grey\_avg1, 2, 3 - min(grey\_avg)}{max(grey\_avg) - min(grey\_avg)} * 255 \quad \text{Equation 16}$$

Image Fusion

Equation 17 and 18 were used to calculate the merging factor for image fusion (contribution of the intermediate and contrasted image to the final image). Equations were found empirically (based on 10 different images) by describing the contribution of the intermediate image (prop_image1) to the resulting image using the parameters sharpness, median_grey and noise_est.

$$stat\_factor = \frac{\ln\left(\frac{sharpness}{median\_grey}\right)}{noise\_est * radius\_spatial\_avg} \quad \text{Equation 17}$$

$$prop\_image1 = \frac{(-7.7 * stat\_factor) + 28.5}{100} \quad \text{Equation 18}$$

Equation 19 was executed at the level of patches for each color channel and improves the sharpness of the final image by fusing the intermediate image with the image that was obtained by means of adaptive spatial averaging and contrast enhancement. Equation 19 combines greyHist values (or greyLnAvg values) and greyLn values according to prop_image1. The resulting image was displayed after transforming the merged color values (lum_merged) into pcolor values of the.

$$lum\_merged1,2,3=(greyHist1,2,3*(1-prop\_image1))+ (greyLn1,2,3*prop\_image1) \quad \text{Equation 19:}$$

Figure 21:
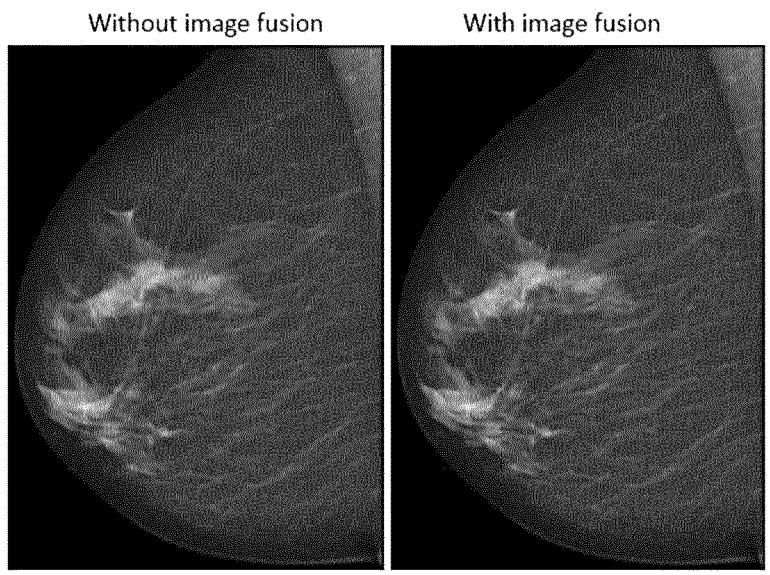
FIGS. 21-23 show different exemplary images with and without image fusion according to the present invention.
Figure 22:
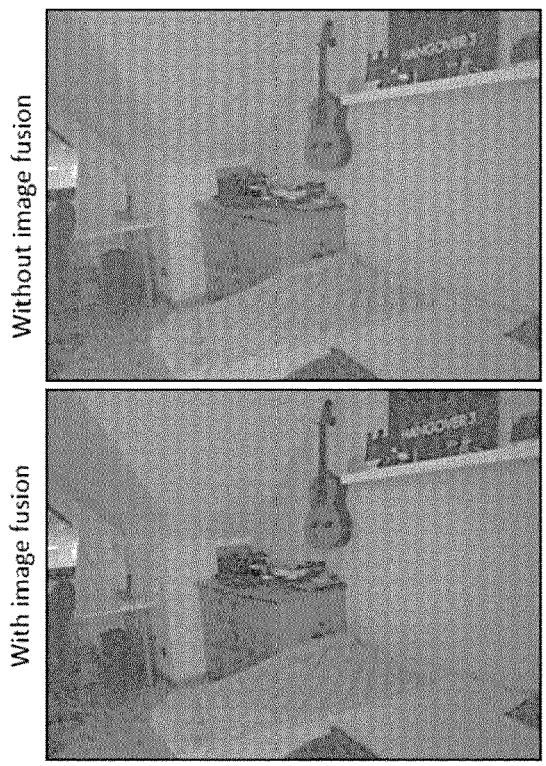
Figure 23:
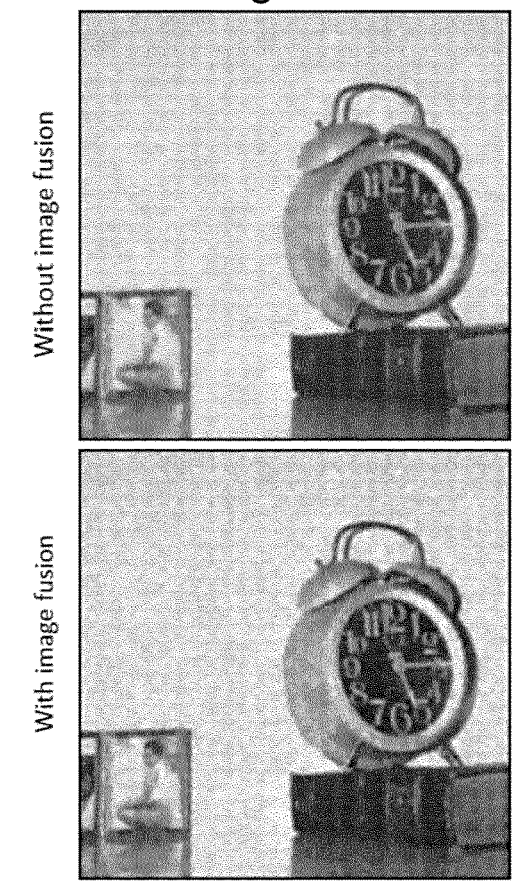

FIGS. 21 to 23 show exemplary images with and without image fusion. Comparison of the images shows that image fusion results in an increased sharpness of the resulting images.

Of course, the invention is not limited to the examples given in this specification, in particular the invention is not delimited to the precise values used in the exemplary calculations and equations, which merely show one embodiment of the invention that can be carried out by a person skilled in the art. In view of the disclosure of this application, a person skilled in the art is able to adjust the exemplary embodiments accordingly, in particular to set or modify the calculations and parameters described above. Accordingly, the characteristics described for a variant or embodiment may also be present in other variants or forms of use, without departing from the scope of protection outlined by the claims that follow.

REFERENCES

Bader, D. A., Jájá, J., Harwood, D. & Davis, L. S. (1996) Parallel algorithms for image enhancement and segmentation by region growing, with an experimental study. The Journal of Supercomputing, 10, 141-168.

Buades, A., Coll, B. & Morel, J. (2005) A Review of Image Denoising Algorithms, with a New One. Multiscale Modeling & Simulation, 4, 490-530.

Chen, Y. & Blum, R. S. (2005) Experimental tests of image fusion for night vision. 8th International Conference on Information Fusion, p. 8 DOI: 10.1109/ICIF.2005.1591895

Crouse M. S., Nowak R. D., and Baraniuk R. G. (1998) Wavelet-based statistical signal processing using hidden Markov models. IEEE Transactions on Signal Processing, 46 (4):886-902.

Dabov K., Foi A., Katkovnik V., and Egiazarian K., (2006) "Image denoising with block-matching and 3D filtering," Proc. SPIE Electronic Imaging '06, no. 6064A-30, San Jose, Calif., USA.

G. Fan and X.-G. Xia. (2001) Image denoising using a local contextual hidden Markov model in the wavelet domain. IEEE Signal Processing Letters, 8 (5):125-128.

Lee, Y. J., Lee, S. & Yoon, J. (2014) A Framework for Moving Least Squares Method with Total Variation Minimizing Regularization. J Math Imaging Vis 48, 566-582.

Liu, C., Szeliski, R., Bing Kang, S., Zitnick, C. L. & Freeman, W. T. (2008) Automatic estimation and removal of noise from a single image. IEEE transactions on pattern analysis and machine intelligence, 30, 299-314.

Maggioni, M., Katkovnik, V., Egiazarian, K. & Foi, A. (2013) Nonlocal Transform-Domain Filter for Volumetric Data Denoising and Reconstruction. IEEE Transactions on Image Processing, 22, 119-133.

Nirmala, S. O., Dongale, T. D. & Kamat, R. K. (2012) Review on Image Enhancement Techniques: FPGA Implementation perspective. International Journal of Electronics Communication and Computer Technology, 2.

Polesel, A., Ramponi, G. & Mathews, V. J. (2000) Image enhancement via adaptive unsharp masking. IEEE Transactions on Image Processing, 9, 505-510.

Portilla J. (2004) Full blind denoising through noise covariance estimation using Gaussian scale mixtures in the wavelet domain. In Proc. IEEE Int'l Conf. Image Proc., pages 1217-1220.

Rudin, L. I., Osher, S. & Fatemi, E. (1992) Nonlinear total variation based noise removal algorithms. Physica D: Nonlinear Phenomena, 60, 259-268.

Russo, F. (2004) Piecewise Linear Model-Based Image Enhancement. EURASIP Journal on Advances in Signal Processing, 2004, 1861-1869.

Stöck, A. L., O'Carroll, D. C. & Warrant, E. J. (2016) Neural Summation in the Hawkmoth Visual System Extends the Limits of Vision in Dim Light. Current Biology 26, 821-826.

Venkateshwar Rao D., Patil, Naveen S., Babu A. and Muthukumar V. (2006) "Implementation and Evaluation of Image Processing Algorithms on Reconfigurable Architecture using c-based Hardware Description Language," International Journal of Theoretical and Applied Computer sciences GBS publishers & distributers(India)) vol. 1, pp. 9-34.

Wang, Y., Yin, W. & Zhang, Y. (2007) A Fast Algorithm for Image Deblurring with Total Variation Regularization.

Warrant, E., Oskarsson, M. & Malm, H. (2014) The Remarkable Visual Abilities of Nocturnal Insects: Neural Principles and Bioinspired Night-Vision Algorithms. Proceedings of the IEEE, 102, 1411-1426.

Xilinx Inc., (2012) "System Generator for Digital signal Processing, URL available at: http://www.xilinx.com/tools/dsp.htm.

Yoon, S. M. et al. (2014) Adaptive Total Variation Minimization-Based Image Enhancement from Flash and No-Flash Pairs, Adaptive Total Variation Minimization-Based Image Enhancement from Flash and No-Flash Pairs. The Scientific World Journal, The Scientific World Journal 2014, 2014, e319506.

Zhang, N., Chen, Y. & Wang, J. (2010) Image parallel processing based on GPU. 2010 2nd International Conference on Advanced Computer Control (ICACC), pp. 367-370.

The invention claimed is:

1. A method for processing of a grey scale image, in particular a dim grey scale image, comprising the following steps:

a) receiving an initial grey scale image, said initial grey scale image having a plurality of pixels at an initial resolution, b) calculating parameters characterizing the luminance (gain, median_grey, var_grey) and the noise level (X, noise_estimate, radius_spatial_summation, grid_size, threshold_var) of the initial grey scale image of step a), c) creating a basic intermediate image, said basic intermediate image having a plurality of basic receptors at a calculated resolution that is equal or lower than the resolution of the initial grey scale image, wherein each basic receptor represents a number of corresponding pixels of the image of step a) by mapping the number of pixels to a basic receptor, and wherein the number of pixels to be mapped to a basic receptor is derived from the parameters of step b), and wherein the number of basic receptors is derived in dependence of the number of pixels of the initial grey scale image and in dependence from the parameters of step b), d) creating an averaged intermediate image, said averaged intermediate image having a plurality of averaged receptors (greyAvg) at a resolution essentially similar to the resolution of the basic intermediate image of step c), wherein the averaged receptors (greyAvg) are calculated by applying adaptive spatial averaging on the intermediate image of step c), wherein adaptive spatial averaging comprises the steps d1) selecting a basic receptor of the intermediate image, wherein the distance r between directly neighboring basic receptors is set to an initial value, preferably r=1, d2) calculating the deviation of basic receptors (variance(greyLn), variance(summed_grey)) that are arranged within a distance r with regard to the selected basic receptor, d3) comparing the deviation (variance(greyLn)) calculated in step d2) with a threshold (threshold_var) derived from the parameters of step b), and increasing the distance r in case the calculated deviation does not exceed the threshold (threshold_var), d4) iteratively repeating steps d2 to d3 until the deviation calculated (variance(greyLn)) in the previous step d3) exceeds the threshold (threshold_var), and d5) averaging the selected basic receptor based on the basic receptors that are arranged within the previously set distance r, yielding an averaged receptor (greyAvg) of the averaged intermediate image, wherein steps d1 to d5 are applied on each basic receptor of the basic intermediate image, e) creating an enhanced grey scale image by interpolation of pixels based on the averaged receptors (greyAvg) of the averaged intermediate image of step d).

2. The method of claim 1, wherein in step c) the mapping of the number of pixels to a basic receptor is executed by retrieving the luminance value of each pixel within the number of pixels to set a corresponding luminance of each basic receptor, in particular by summation or averaging the luminance values of the pixels, wherein said pixels are neighboring to each other.

3. The method according to claim 1, wherein the contrast of the basic intermediate image is enhanced by applying a logarithmic transformation on the values of each basic receptor.

4. The method according to claim 1, wherein in case the calculated deviation (variance(greyLn)) of step d3) does not succeed the threshold (threshold_var), the distance r in step d3 is increased by at least 1.

5. The method according to claim 1, wherein in step d3) in case the calculated deviation (variance(summed_grey or greyLn)) does not exceed the threshold (threshold_var) the distance r is increased by n, wherein n is a natural number, and n is in the range of n≥1, wherein the value of n is derived from the parameters of step b).

6. The method according to claim 1, wherein the maximum distance r in step d3) is limited to the value 10.

7. The method according to claim 1, wherein in step c) the number of basic receptors is less or equal to the number of pixels, and wherein the number of pixels to be mapped to each basic receptor is similar for all basic receptors and derived from the parameters of step b).

8. The method according to claim 1, wherein the number of basic receptors is calculated as follows:

$$N_{rb} = \frac{1}{\text{grid\_size}^2} N_{pi},$$

wherein the variable grid_size is a natural number in the range of grid_size≥1, wherein the value of the variable grid_size is derived from the parameters of step b).

9. The method according to claim 1, wherein contrast enhancement is applied on the averaged intermediate image by multiplying the luminance value of each averaged receptor (greyAvg) with a factor k, wherein the factor k is derived from the initial luminance values of the sum of the averaged receptors (greyAvg).

10. The method according to claim 1, wherein the initial grey scale image has a plurality of pixels at an initial resolution between 100×100 and 2000×2000.

11. The method according to claim 1, wherein the grey scale image has a bit depth between 7 and 32 bit.

12. The method according to claim 1, wherein the calculations of separate basic receptors and/or the calculations of separate averaged receptors (greyAvg) and/or interpolations of separate pixels of the enhanced grey scale image are executed in parallel.

13. An image processing device comprising
a storage medium for storing a program-logic for carrying out the method according to claim 1, and
a processor for carrying out said program-logic and/or the method according to claim 1.

14. The image processing device according to claim 13, wherein said image processing device is realized in one of the following devices:
a surveillance system, a night vision device, a wearable night vision device, a night vision device of a vehicle or drone, a medical diagnostic device, or a fluorescence image enhancer.

15. The method according to claim 9, wherein k>1.

16. The method according to claim 11, wherein the grey scale image has a bit depth of 8 bit.

17. The image processing device according to claim 13, wherein the processor is a field-programmable gate array.

* * * * *